United States Patent
Hardt et al.

(10) Patent No.: US 10,153,716 B2
(45) Date of Patent: Dec. 11, 2018

(54) COMPENSATION FOR ASYMMETRIES IN ELECTRODYNAMICS OF BLDC TYPE MACHINES USING HALL SENSORS

(71) Applicant: IXYS, LLC, Milpitas, CA (US)

(72) Inventors: Eric Arnold Hardt, San Jose, CA (US); Thomas Andrew Ormiston, Tigard, OR (US)

(73) Assignee: IXYS, LLC, Milpitas, CA (US)

( * ) Notice: Subject to any disclaimer, the term of this patent is extended or adjusted under 35 U.S.C. 154(b) by 0 days.

(21) Appl. No.: 15/495,879

(22) Filed: Apr. 24, 2017

(65) Prior Publication Data
US 2018/0309396 A1 Oct. 25, 2018

(51) Int. Cl.
*H02K 11/215* (2016.01)
*H02P 6/15* (2016.01)

(52) U.S. Cl.
CPC ............ *H02P 6/153* (2016.02); *H02K 11/215* (2016.01)

(58) Field of Classification Search
CPC .............................. H02K 11/215; H02P 6/153
USPC ..................................................... 318/400.14
See application file for complete search history.

(56) References Cited

U.S. PATENT DOCUMENTS

| | | | | |
|---|---|---|---|---|
| 4,599,550 A * | 7/1986 | Robertson, Jr. | ... | H02M 7/53873 318/798 |
| 6,002,234 A * | 12/1999 | Ohm | .................. | H02P 6/15 318/438 |
| 2013/0033907 A1* | 2/2013 | Zhou | .................. | H02M 1/12 363/37 |
| 2015/0054437 A1* | 2/2015 | Oomura | .................. | H02P 6/002 318/400.06 |
| 2017/0054391 A1* | 2/2017 | Qian | .................. | H02P 6/16 |

OTHER PUBLICATIONS

Z32F128 MCU, Product Specification, Zilog, Inc., Nov. 2015.

* cited by examiner

*Primary Examiner* — Muhammad S Islam

(57) ABSTRACT

A microcontroller controls a BLDC motor with Hall sensors. In a calibration mode, the microcontroller operates the motor at substantially constant load and speed. A first current value across the motor is detected. A reference phase angle value is adjusted and a second current value is detected. If the second current value is less than the first current value, then the reference phase angle value is adjusted and a next current value is detected. The adjusting and detecting is repeated until the next current value is greater than the previous current value indicating that the adjustment increased current across the motor. The adjusted reference phase angle value before increased motor current is stored. In a normal operating mode, using the adjusted reference phase angle value results in desired motor operation where minimal current is consumed for a given load and speed despite asymmetries in motor windings and Hall sensor placement.

20 Claims, 19 Drawing Sheets

PERSPECTIVE DIAGRAM OF BLDC MOTOR WITH
HALL SENSORS ATTACHED TO STATOR

PERSPECTIVE DIAGRAM OF PACKAGED HALL SENSOR DEVICE

HALL SENSOR OUTPUTS USED BY PROCESSOR TO DETERMINE ANGULAR POSITION OF ROTOR

USING CLOCKWISE ADJUSTMENT VALUE TO ACHIEVE DESIRED MOTOR OPERATION (ANOTHER EMBODIMENT)

DETERMINE AVERAGE STATOR CURRENT VALUE FROM MEASURED
VOLTAGES ACROSS SENSE RESISTOR

MOTOR UNDER CONSTANT LOAD AND SPEED OPERATING IN
CALIBRATION AND NORMAL MODE
(EXAMPLE #1)

```
VOID ADC2_IRQHANDLER(VOID)                        ── DETERMINE WHETHER CALIBRATION HAS
{                                                              ALREADY BEEN PERFORMED
#IFDEF PHS_ANGLE_CALIBRATION
  IF((CW_CALDONE==0) || (CCW_CALDONE==0))
  {
    SVM.CURRENT_READING = ((AD2->DDR) & 0X0000FFF0)>>4;
    ┌─────────────────────────────────────────┐
   ╱ CURRENT1 += SVM.CURRENT_READING;          ╲
  │  CRRNTMEAN1 = CURRENT1>>7;                  │
  │  CURRENT1 -= CRRNTMEAN1;                    │──── 152
  │                                             │   PERFORMS RUNNING
  │  CURRENT2 += CRRNTMEAN1;                    │   AVERAGE OF CURRENT
  │  CRRNTMEAN2 = CURRENT2>>7;                  │     MEASUREMENTS
  │  CURRENT2 -= CRRNTMEAN2;                    │
  │                                             │
  │  CURRENT3 += CRRNTMEAN2;                    │
  │  CRRNTMEAN3 = CURRENT3>>7;                  │
  │  CURRENT3 -= CRRNTMEAN3;                    │
  │                                             │
  │  CURRENT4 += CRRNTMEAN3;                    │
  │  CRRNTMEAN4 = CURRENT4>>7;                  │
  │  CURRENT4 -= CRRNTMEAN4;                    │
  │                                             │     DELAY UNTIL MOTOR SPEED HAS
  │  CURRENT5 += CRRNTMEAN4;                    │    SETTLED UNDER CONSTANT LOAD
   ╲ CRRNTMEAN5 = CURRENT5>>7;                 ╱              ─153
    ╲CURRENT5 -= CRRNTMEAN5;                  ╱
    └─────────────────────────────────────────┘

IF(STARTSAMPLING++ >= START_SAMPLES) {
      STARTSAMPLING=STARTSAMPLING+1;
      IF(FLAG.DONE == 0) {
        IF((INCREMENTS <= MAX_INCREMENTS) && (FLAG.SAMPLINGDONE==0)) {
          IF(CURRSAMPLECNTR++ <= CURRSAMPLES) {
            CURRREADARRAY[INCREMENTS]=CRRNTMEAN5;
          }
          ELSE {
            CURRSAMPLES += SAMPLE_PERIOD;
            INCREMENTS++;

IF(SVM.DIR==1)
              CW_PHASEANGLECAL = INCREMENTS;
            ELSE
              CCW_PHASEANGLECAL = INCREMENTS;

IF(INCREMENTS >= 2) {
              IF((CURRREADARRAY[INCREMENTS-1] > CURRREADARRAY[INCREMENTS-2])) {
                FLAG.SAMPLINGDONE=1;
              }
            }
          }
        }
        ELSE {
          INCREMENTS=0;
          FLAG.SAMPLINGDONE=1;
        }
```

FIG. 19A

```
                                                           INCREMENT OFFSET UNTIL AVERAGE
        IF(FLAG.SAMPLINGDONE==1) {                         OF MEASURED CURRENTS INCREASES
154        INCREMENTS=1;
           WHILE(INCREMENTS < MAX_INCREMENTS) {
              IF(CURRREADARRAY[INCREMENTS] < (CURRREADARRAY[INCREMENTS-1]-HYST)) {
                 INCREMENTS++;
              }                                         FOR CLOCKWISE OPERATION,
156        ELSE {                    157      158       STORE OFFSET PRIOR TO OFFSET
              IF(SVM.DIR==1) {                          THAT CAUSED CURRENT INCREASE
133              CW_PHASEANGLECAL = INCREMENTS-1;

IF(CW_CALDONE==0) {    159
                    CW_CALDONE=1;
                    MP0->CR2 &= ~0X01;
                    MP0->PMR |= 0X0300;
                    INIT(0,0,0);
                    PROGRAMPAGE((UINT32_T)(CALVALUES+0),4, &CW_PHASEANGLECAL);
160                 PROGRAMPAGE((UINT32_T)(CALVALUES+4),4, &CW_CALDONE);
STORE OFFSET        UNINIT(0);
FOR CLOCKWISE       SCU_CLOCKINIT();
OPERATION IN        SVM.DIR=0;
NON-VOLATILE        START();
   MEMORY      }                                 FOR COUNTER-CLOCKWISE OPERATION,
                                                 STORE OFFSET PRIOR TO OFFSET THAT
              }                                      CAUSED CURRENT INCREASE
              ELSE {
134              CCW_PHASEANGLECAL = INCREMENTS-1;

IF(CCW_CALDONE==0) {    161
                    CCW_CALDONE=1;
                    MP0->CR2 &= ~0X01;
                    MP0->PMR |= 0X0300;
                    INIT(0,0,0);
                    PROGRAMPAGE((UINT32_T)(CALVALUES+8),4, &CCW_PHASEANGLECAL);
162                 PROGRAMPAGE((UINT32_T)(CALVALUES+12),4, &CCW_CALDONE);
STORE OFFSET        UNINIT(0);
FOR COUNTER-        SCU_CLOCKINIT();
 CLOCKWISE          SVM.DIR=1;
OPERATION IN        START();
NON-VOLATILE   }
   MEMORY
              }
              IF((CW_CALDONE==1) && (CCW_CALDONE==1))
                 FLAG.DONE=1;
                 BREAK;
           }                 155
           INCREMENTS=0;
        }
      }
   }
 }
#ELSE
   CW_PHASEANGLECAL=CW_PHS_ANG_CAL_VAL;
   CCW_PHASEANGLECAL=CCW_PHS_ANG_CAL_VAL;
#ENDIF
   AD2->SR = AD2->SR;
 }
```

FIG. 19B

| KEY TO FIG. 19 |
| --- |
| FIG. 19A |
| FIG. 19B |

COMPENSATION FOR ASYMMETRIES IN ELECTRODYNAMICS OF BLDC TYPE MACHINES USING HALL SENSORS

TECHNICAL FIELD

The present invention relates generally to motor control, and in particular to compensating for system asymmetries in motor control applications.

BACKGROUND INFORMATION

Typical motor control applications use an encoder to obtain more precise location information of a stator and rotor of a motor. In one example, the motor is a BrushLess Direct Current (BLDC) synchronous motor. The encoder outputs a digital code that indicates, with relatively high resolution, where the rotor is spatially with respect to the stator thereby eliminating the need for Hall sensors. However, use of an encoder is expensive and substantially increases the cost of the end application.

To reduce costs, Hall effect sensors are often used in motor control applications. Hall sensors are used to detect the location of the rotor during rotation by detecting a change in the magnetic field caused by rotation of the rotor. In a typical motor control system using Hall sensors to detect rotor position with respect to the stator, Hall sensors are attached along the stator at equally spaced angular locations. For example, three Hall sensors are attached to the stator at thirty degree intervals or sixty degree intervals. With knowledge of the location of the Hall sensors, an engineer can program a motor controller in accordance with a desired control topology, such as space vector modulation (SVM).

The motor controller is programmed using two assumptions. First, the control implementation assumes that the angular locations of the Hall sensors are precise. If, for example, the engineer designs the program for the controller assuming that the Hall sensors are spaced thirty degrees apart, but in reality the Hall sensors angular locations are slightly displaced, for example, twenty-nine degrees apart, then the motor controller will not switch efficiently. Consequently, the imprecisely positioned Hall sensors will detect the rotor too early or too late during motor operation. Such variations in angular position of the Hall sensor often occur during manufacture or assembly. Assuring precise placement of Hall sensors can significantly increase manufacturing costs.

Second, the control implementation assumes that the Hall sensor windings are symmetrical. A Hall sensor is an electromagnetic device and uses metal windings to detect changes in magnetic field. Thus, if the Hall sensor windings are not even, then they may not detect the rotor position consistently when the motor is operating in counter-clockwise and clockwise directions. Efficiency of the implementation depends on the veracity of the two assumptions.

If, however, the two assumptions are not actually true, then certain inefficiencies will be manifest. Such inefficiencies result in varying current draw depending on whether the motor is driven in clockwise or counter-clockwise directions. For example, the motor could draw more current when driven in the clockwise direction than when driven in the counter-clockwise direction. Such variances in current draw often go unnoticed or are not identified as a problem. A solution that minimizes the effects of such inefficiencies is desired.

SUMMARY

A controller integrated circuit controls a BLDC synchronous motor. A plurality of Hall sensors are attached to the motor. Each of the Hall sensors outputs a one-bit digital signal. The combination of the one-bit digital signals output by the Hall sensors forms a Hall sensor state value. The Hall sensor state value indicates a position of the rotor with respect to the stator. The controller integrated circuit is coupled to receive the Hall sensor state value. The controller integrated circuit maintains a plurality of reference phase angle values used to maintain a ninety-degree (90°) phase relationship between the rotor and the stator. The ninety-degree (90°) phase relationship is typically disrupted when a load is applied to the motor. The controller integrated circuit is configured to enter a calibration mode that determines at least one reference phase angle value that compensates for any misplacement of the Hall sensors or for asymmetries in the motor windings. After the calibration mode is complete, the controller integrated circuit switches into a normal operating mode during which the determined reference phase angle value is used by the controller integrated circuit to control the BLDC synchronous motor.

At startup, the controller integrated circuit enters a calibration mode. In the calibration mode, the controller integrated circuit: (a) causes the BLDC synchronous motor to be operated in a direction (clockwise or counter-clockwise), (b) detects a first stator current across a sense resistor and generates a first stator current value indicative of an average current through the motor, (c) adjusts at least one of the reference phase angle values, and (d) detects a second stator current across a sense resistor and generates a second stator current value indicative of an average current through the motor. The controller integrated circuit repeats (a), (b), (c), and (d) until the next stator current value is greater than the prior stator current value. After the controller integrated circuit determines that the next stator current value is greater than the prior stator current value, the adjusted reference phase angle values prior to the increase in stator current are stored. Next, the controller integrated circuit switches into a normal operating mode.

In the normal operating mode, the controller integrated circuit uses the adjusted reference phase angle values stored in the calibration mode. Use of the adjusted reference phase angle values achieves desired motor operation. The desired motor operation is an operating condition in which minimal current is consumed by the motor when the motor is operating under a substantially constant load and a substantially constant speed. In one example, under a given load and speed, the motor consumes less current in a given period of time by using the adjusted reference phase angle values than if the adjusted reference phase angle values were not used in controlling the motor.

In one example, the controller integrated circuit is a microcontroller coupled to control a BLDC synchronous motor. On startup, the microcontroller determines whether a calibration operation has already been performed for the motor coupled to the microcontroller. If it is determined that no calibration operation has been performed, then the microcontroller enters the calibration mode and determines at least one adjusted reference phase angle value. If, on the other hand, it is determined that a calibration operation has already been performed, then the microcontroller enters the normal operating mode.

In the normal operating mode, the microcontroller reads an adjustment value from a non-volatile memory. During motor control, the microcontroller combines the adjustment value with at least one of the reference phase angle values to obtain an adjusted reference phase angle value. The adjusted reference phase angle value is supplied to a PWM sine wave LUT to obtain a PWM input value. The PWM input value is supplied to Pulse Width Modulator (PWM) circuit. The PWM circuit generates PWM signal from the PWM input value and supplies the generated PWM signal to driver circuitry that in turn drives a gate of a switching transistor. The generated PWM signal switches a current through a winding of the motor. Using the adjusted reference phase angle value results in desired motor operation where a minimal amount of current is consumed by the motor for a given load and speed condition.

Further details and embodiments are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 19 includes FIGS. 19A and 19B which together show one embodiment of an amount of processor-executable instructions which when executed by a processor cause the processor to determine the adjusted reference phase angle values that result in desired motor operation.

DETAILED DESCRIPTION

Reference will now be made in detail to some embodiments of the invention, examples of which are illustrated in the accompanying drawings.

Figure 1:
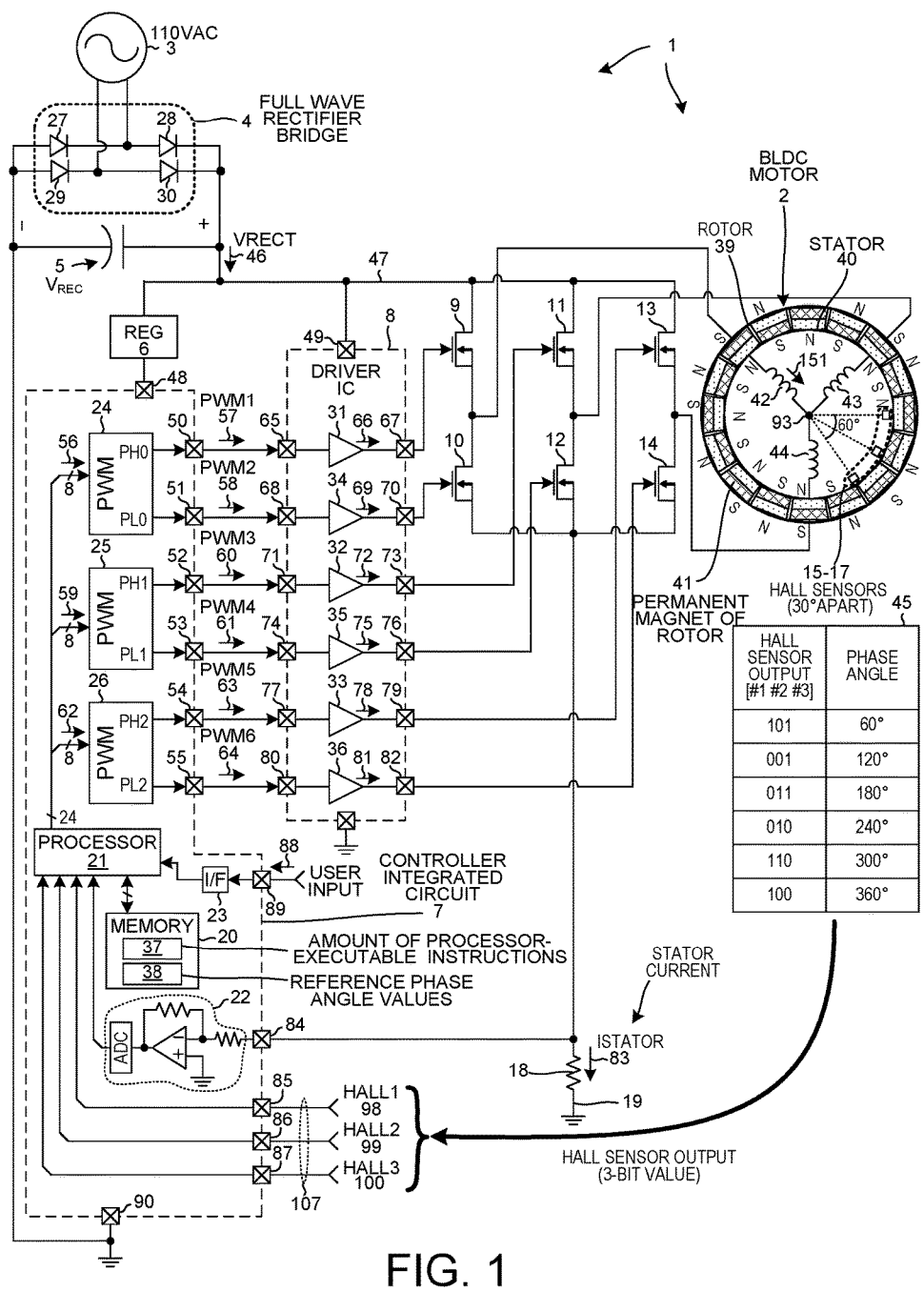
FIG. 1 is a diagram of a system 1 that drives a BLDC motor 2.

FIG. 1 is a diagram of a system 1 that drives a BLDC motor 2. The system 1 comprises an AC voltage source 3, a full wave rectifier bridge 4, a capacitor 5, a regulator circuit 6, a controller integrated circuit 7, a gate driver integrated circuit 8, an inverter bridge having six switching transistors 9-14, hall sensors 15, 16, and 17, a sense resistor 18, and a ground node 19. The controller integrated circuit 7 includes a memory 20, a processor 21, current sense circuitry 22, interface circuitry 23, and pulse width modulator (PWM) circuits 24, 25, and 26. The full wave bridge rectifier 4 comprises diodes 27, 28, 29, and 30. The driver circuit 8 comprises high-side drivers 31, 32, and 33, and low-side drivers 34, 35, and 36. The memory 20 stores an amount of instructions 37 that when executed by the processor 21 causes the controller integrated circuit 7 to determine and store a reference phase angle adjustment value 38 as described in further detail below. Memory 20 is an example of a processor-readable medium. In one embodiment, controller integrated circuit 7 is a Z32F128 ARM Cortex M3 commercially available microcontroller available for sale from Zilog, Inc. having an address of 1590 Buckeye Dr, Milpitas, Calif. 95035.

The BLDC motor 2 has a rotor 39 and a stator 40. The rotor 39 has a plurality of single pole pair permanent magnets disposed adjacent to each other along the perimeter of the rotor 39. Reference numeral 41 identifies one such permanent magnet. The stator 40 is a three-phase stator comprising a first stator winding 42, a second stator winding 43, and a third stator winding 44. During operation of BLDC motor 2, stator windings 42, 43, and 44 are energized so that the rotor 39 rotates around the stator 40. The stator 40 is fixed and does not rotate. In other embodiments, the rotor is in the interior and the stator is disposed on an exterior and surrounds the rotor. The BLDC motor 2 of FIG. 1 is a conceptual diagram of a simplified BLDC motor. Other BLDC motors have more than three-phases.

Three Hall sensors 15, 16, and 17 are attached to the stator 40 via a printed circuit board attachment (not shown). Each of the Hall sensors 15, 16, and 17 is placed along the stator 40 at thirty degree intervals. The first Hall sensor 15 is positioned thirty degrees from the second Hall sensor 16. The second Hall sensor 16 is positioned thirty degrees from the third Hall sensor 17. In other examples, the Hall sensors are placed sixty degrees apart from each other. In yet other examples, the Hall sensors are placed one hundred and twenty degrees apart.

Each of the Hall sensors 15, 16, and 17 outputs a one-bit digital value in response to detecting a change in a magnetic field. For example, as one of the permanent magnets of the rotor 39 passes by one of the Hall sensors, the Hall sensor's digital output will switch. The combination of the three one-bit digital output values determines a Hall sensor commutation state. There are six commutation states, each corresponding to one of six digital output values [101], [001], [011], [010], [110], and [100]. Each commutation state is associated with the rotor being at a phase angle with respect to the stator. Table 45 shows the Hall sensor commutation sequence and associated phase angle. The controller integrated circuit 7 uses the Hall sensor output values to maintain the rotor and stator in appropriate phase. For example, if the rotor begins to lag undesirably, then the controller integrated circuit 7 adjusts operation of the motor 2 to compensate for the lag.

In operation, an incoming AC supply voltage (for example, 110 VAC) from the AC voltage source 3 is rectified by a full wave bridge rectifier 4 so that the capacitor 5 is charged. Incoming current flows into the rectifier 4, flows through one of the two diodes 28 and 30, flows into the remainder of the system 1, and flows back from the remainder of the system 1, and flows through one of the two diodes 27 and 29, and back to the voltage source 3. The voltage regulator circuit 6 regulates a voltage VRECT 46 on DC supply node 47. The resulting regulated supply voltage is supplied to controller integrated circuit 7 via supply terminal 48. VRECT 46 is supplied to a terminal of high side N-channel field effect transistors 9, 11, and 13, and to driver circuitry 8 via supply terminal 49.

The controller integrated circuit 7 controls the B LDC motor 2 by driving sine voltage signals across each of the motor windings 42, 43, and 44. The controller integrated circuit 7 outputs six pulse width modulated switch control signals PWM1-PWM6 onto PWM output terminals 50-55. The PWM circuits 24, 25, and 26 generate the PWM switch control signals PWM1-PWM6 from PWM input values received from the processor 21. PWM circuit 24 receives a PWM input value 56 and generates a high side PWM switch control signal PWM1 57 output onto terminal 50 and a low side PWM switch control signal PWM2 58 output onto terminal 51. The low side PWM switch control signal PWM2 58 is an inverted version of the high side PWM switch control signal PWM1 57. PWM circuit 25 receives a PWM input value 59 and generates a high side PWM switch control signal PWM3 60 output onto terminal 52 and a low side PWM switch control signal PWM4 61 output onto terminal 53. The low side PWM switch control signal PWM4 61 is an inverted version of the high side PWM switch control signal PWM3 60. PWM circuit 26 receives a PWM input value 62 and generates a high side PWM switch control signal PWM5 63 output onto terminal 54 and a low side PWM switch control signal PWM6 64 output onto terminal 55. The low side PWM switch control signal PWM6 64 is an inverted version of the high side PWM switch control signal PWM5 63. The high side PWM switch control signals PWM1 57, PWM3 60, and PWM5 63 are 120° degrees out of phase with respect to each other. The low side PWM switch control signals PWM2 58, PWM4 61, and PWM6 64 are 120° degrees out of phase with respect to each other.

The PWM switch control signals PWM1-PWM6 output by the controller integrated circuit 7 drive gates of switching transistors 9-14 via driving circuitry 8. High side driver 31 receives the high side PWM switch control signal PWM1 57 via terminal 65 and supplies drive signal 66 onto gate of high side N-channel field effect transistor 9 via terminal 67. Low side driver 34 receives the low side PWM switch control signal PWM2 58 via terminal 68 and supplies drive signal 69 onto gate of low side N-channel field effect transistor 10 via terminal 70. The switch control signal PWM1 57 and the switch control signal PWM2 58 control transistors 9 and 10 to switch current through the first winding 42 of BLDC motor 2. High side driver 32 receives the high side PWM switch control signal PWM3 60 via terminal 71 and supplies drive signal 72 onto the gate of high side N-channel field effect transistor 11 via terminal 73. Low side driver 35 receives the low side PWM switch control signal PWM4 61 via terminal 74 and supplies drive signal 75 onto gate of low side N-channel field effect transistor 12 via terminal 76. The switch control signal PWM3 60 and the switch control signal PWM4 61 control transistors 11 and 12 to switch current through the second winding 43 of BLDC motor 2. High side driver 33 receives the high side PWM switch control signal PWM5 63 via terminal 77 and supplies drive signal 78 onto the gate of high side N-channel field effect transistor 13 via terminal 79. Low side driver 36 receives the low side PWM switch control signal PWM6 64 via terminal 80 and supplies drive signal 81 onto gate of low side N-channel field effect transistor 14 via terminal 82. The switch control signal PWM5 63 and the switch control signal PWM6 64 control transistors 13 and 14 to switch current through the third winding 44 of BLDC motor 2.

The controller integrated circuit 7 is configured to detect a stator current ISTATOR 83 via sense resistor RSENSE 18 using current sense circuitry 22. A sense terminal 84 is coupled to an upper lead of the sense resistor RSENSE 18. A lower lead of the sense resistor RSENSE 18 is coupled to ground terminal 19.

The controller integrated circuit 7 is configured to receive an input control signal 88 onto a control terminal 89. Processor 21 receives the input control signal 88 via the interface circuitry 23. In one example, the input control signal 88 is output by a user operated potentiometer. By appropriately setting the potentiometer, the user can control a rotation rate of rotor 39 during operation of the BLDC motor 2.

The controller integrated circuit 7 is configured to receive 3-bit Hall sensor output information from the three Hall sensors 15, 16, and 17. A first Hall sensor input terminal 85 receives a Hall sensor output digital value HALL1 from first Hall sensor 15. A second Hall sensor input terminal 86 receives a Hall sensor output digital value HALL2 from second Hall sensor 16. A third Hall sensor input terminal 87 receives a Hall sensor output digital value HALL3 from third Hall sensor 17. The controller integrated circuit 7 has a voltage supply terminal 48. Through terminal 48, the controller integrated circuit 7 receives a regulated supply voltage from regulator circuit 6. The controller integrated circuit 7 has a ground terminal 90 coupled to ground node 19.

Figure 2:
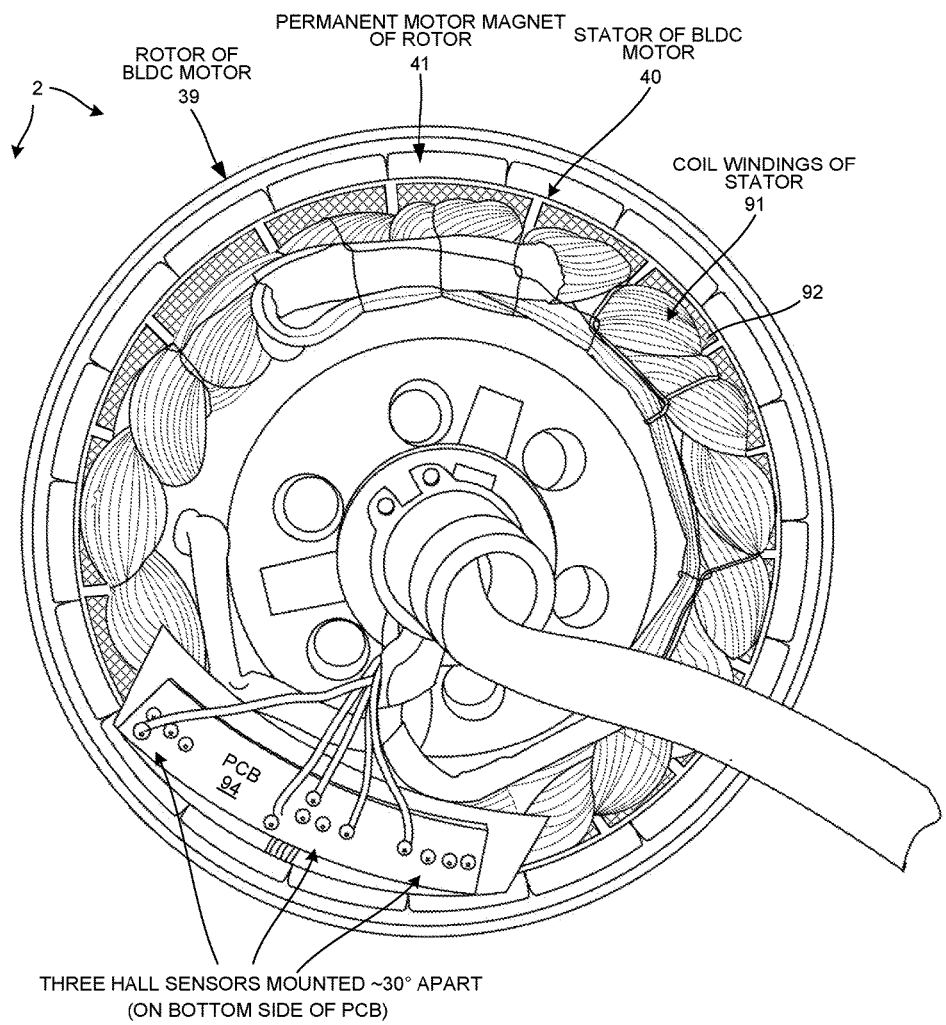
FIG. 2 is a perspective diagram of the BLDC motor 2.

FIG. 2 is a perspective diagram of the BLDC motor 2. In this example, the rotor 39 has a plurality of permanent magnets disposed along an outer perimeter of the rotor 39. The rotor 39 surrounds the stator 40. Coil windings 91 are coiled around core portions 92 of the stator 40. The stator windings 42, 43, and 44 of the stator 40 shown in FIG. 1 are a simplified version of the coil windings 91 and are shown as inductors for explanatory purposes. Ends of the windings 42, 43, and 44 couple to a center tap 93 (not shown).

The three Hall sensors 15, 16, and 17 are disposed on a printed circuit board (PCB) attachment 94 shown near an outer perimeter of the stator 40. The Hall sensors 15, 16, and 17 are disposed along on the outer edge of the stator 40 to be as close as possible to the rotor 39 to ensure that the permanent magnets of the rotor 39 can be detected. Reference numeral 41 identifies one such permanent, single-pole pair magnet. The novel methods described below are also usable for BLDC motors in which the stator surrounds the rotor.

Figure 3:
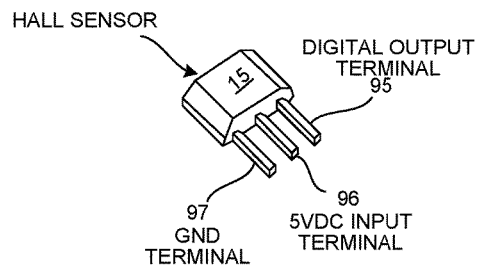
FIG. 3 is a perspective diagram of the Hall sensor device 15.

FIG. 3 is a perspective diagram of the Hall sensor device 15. Hall sensor device 15 is a packaged Hall sensor device that has a digital output terminal 95, a supply voltage input terminal 96, and a ground terminal 97. The first digital output terminal 95 outputs a one-bit digital logic value in response to detecting a change in a magnetic field. In this example, the Hall sensor device 15 is supplied by a 5V+ DC voltage on the supply voltage input terminal 96.

Figure 4:
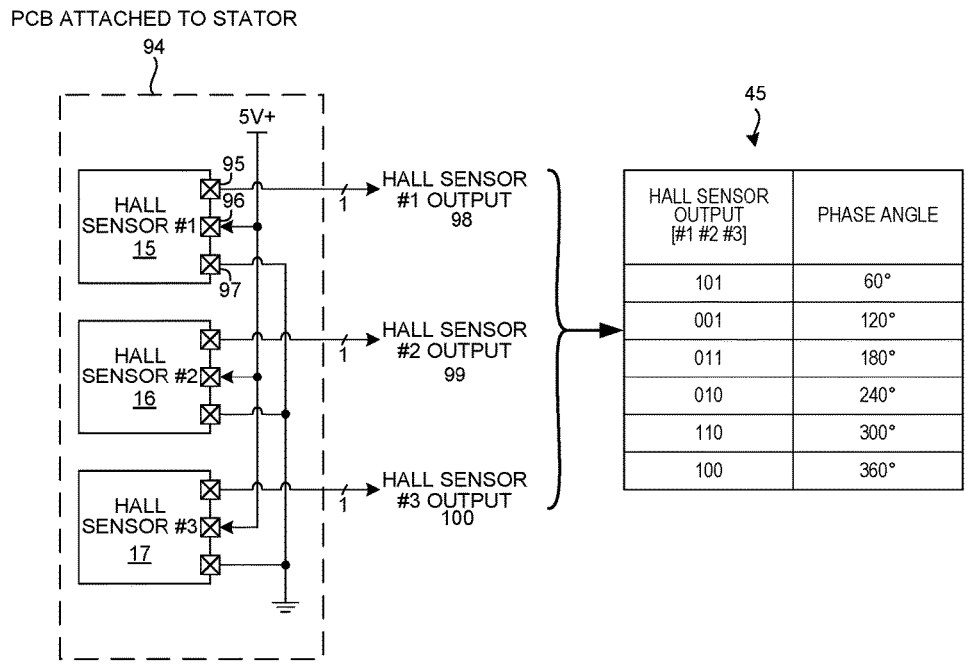
FIG. 4 is a diagram showing how the three Hall sensors 15, 16, and 17 output one-bit digital logic values that correspond to one of six phase angles.

FIG. 4 is a diagram showing how the three Hall sensors 15, 16, and 17 output one-bit digital logic values that correspond to one of six phase angles. Hall sensor 15 receives a 5V+ DC voltage and outputs a first digital logic output value 98. Hall sensor 16 receives a 5V+ DC voltage and outputs a second digital logic output value 99. Hall sensor 17 receives a 5V+ DC voltage and outputs a third digital logic output value 100. The three one-bit digital values correspond to one of six phase angles and one of six commutation states.

Figure 5:
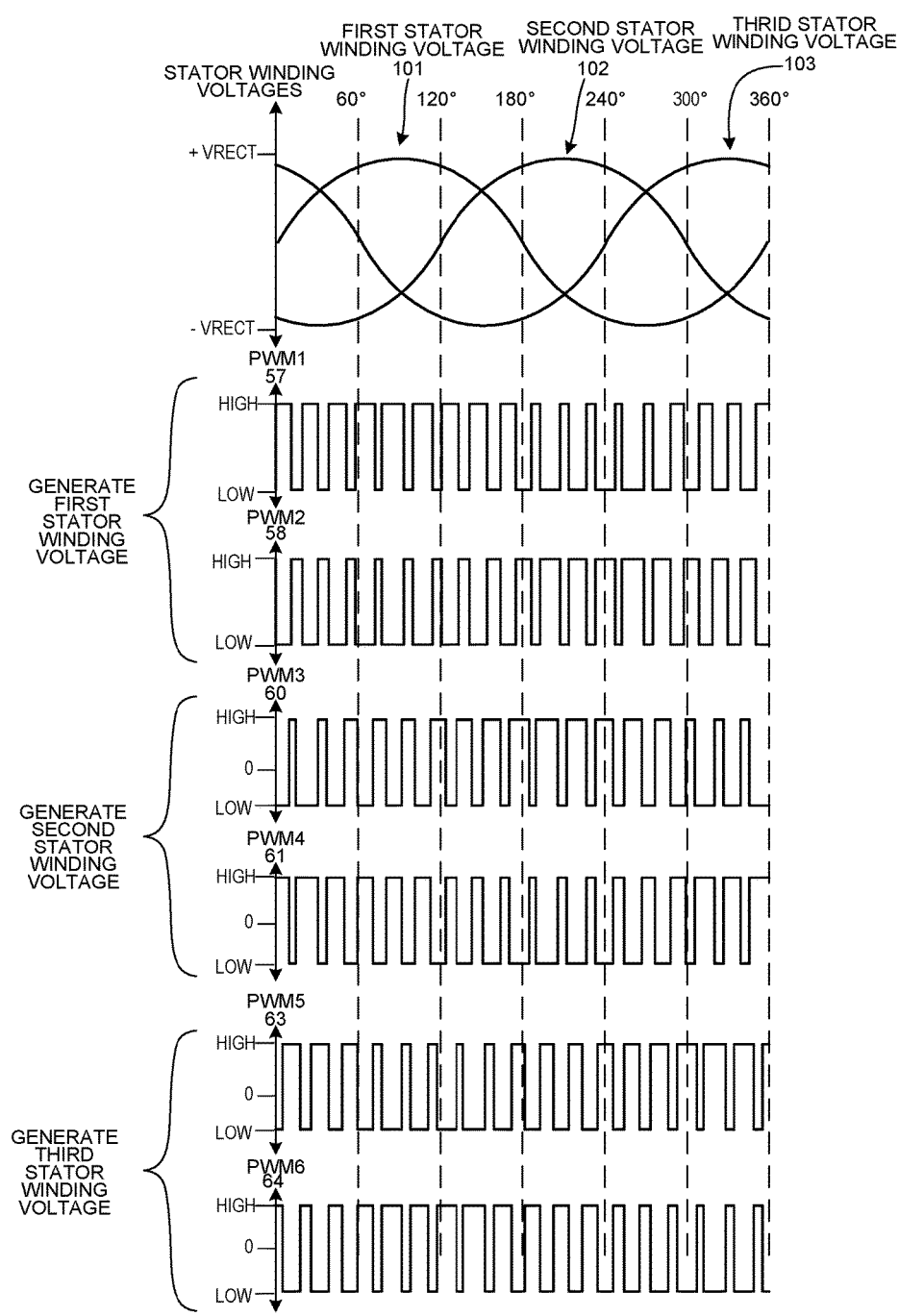
FIG. 5 is a waveform diagram of the PWM switch control signals PWM1 57, PWM2 58, PWM3 60, PWM4 61, PWM5 63, and PWM6 64 and of the stator winding voltages 101, 102, and 103.

FIG. 5 is a waveform diagram of the PWM switch control signals PWM1 57, PWM2 58, PWM3 60, PWM4 61, PWM5 63, and PWM6 64 and of the stator winding voltages 101, 102, and 103. The stator winding voltages 101, 102, and 103 are one hundred and twenty degrees (120°) out of phase with respect to each other. The PWM signals PWM1-PWM6 approximate sine waves in digital form. The BLDC motor 2 is driven by supplying sinusoidal waveforms across the stator windings 42, 43, and 44. The PWM signals PWM1-PWM6 are supplied onto gates of the switching transistors 9-14 which causes the sinusoidal voltages to be supplied to the stator windings 42, 43, and 44. The sinusoidal voltages supplied to windings 42, 43, and 44 are shown in the stator winding voltages waveform diagram. The PWM switch control signals PWM1 57 and PWM2 58 are complementary signals. The PWM switch control signals PWM3 60 and PWM4 61 are complementary signals. The PWM switch control signals PWM5 63 and PWM6 64 are complementary signals.

Figure 6:
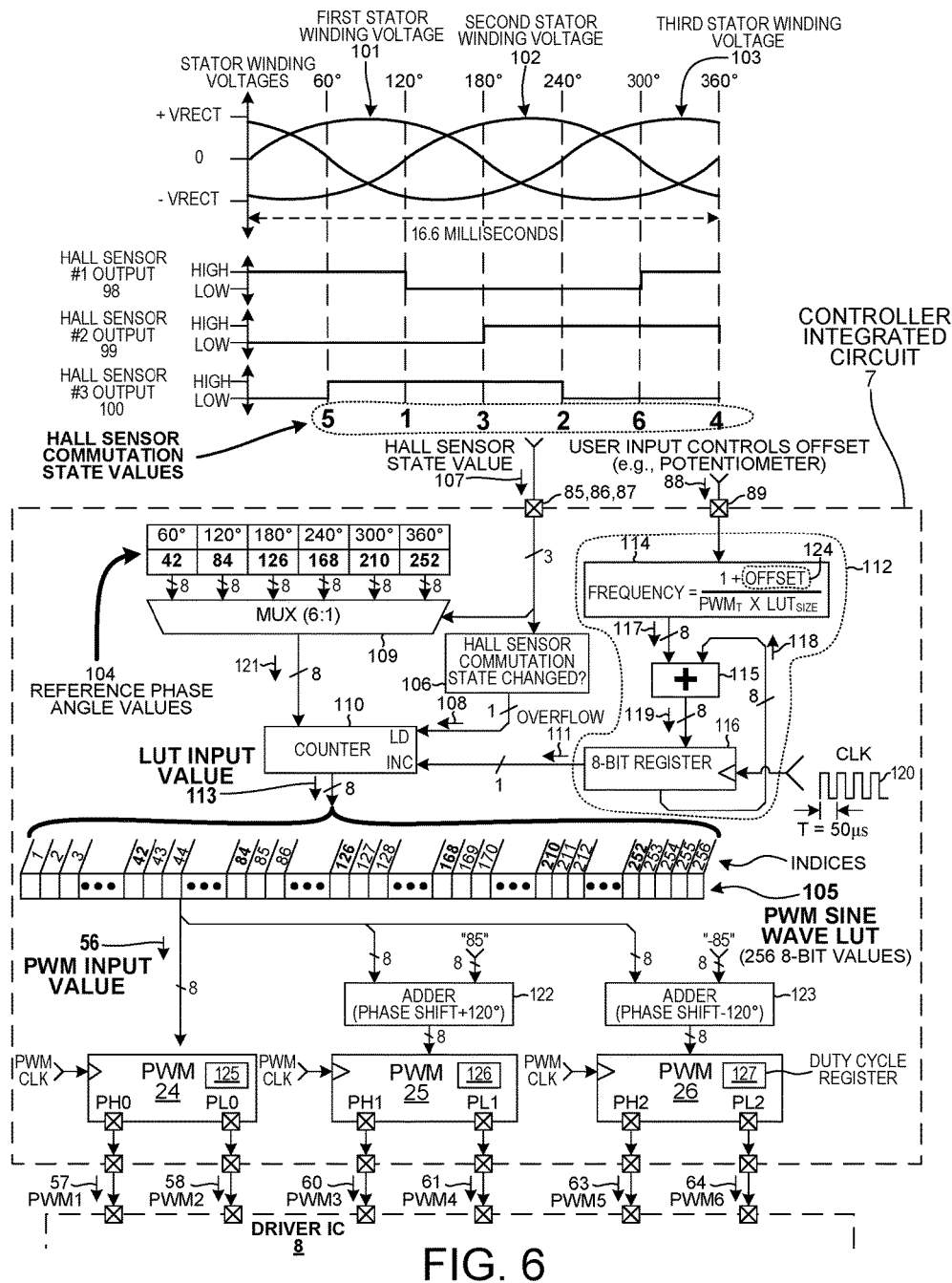
FIG. 6 is a more detailed diagram of controller integrated circuit 7 that shows how the PWM switch control signals are generated.
Figure 7:
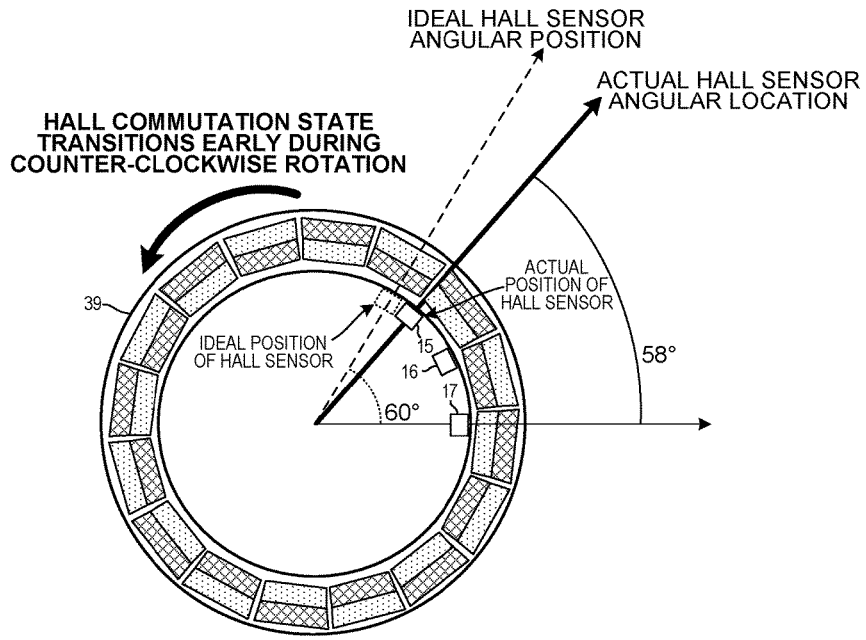
FIG. 7 shows how asymmetries of the positions of the Hall sensors 15, 16, and 17 can cause the Hall sensor state values to transition too early during operation of the BLDC motor 2.
Figure 7:
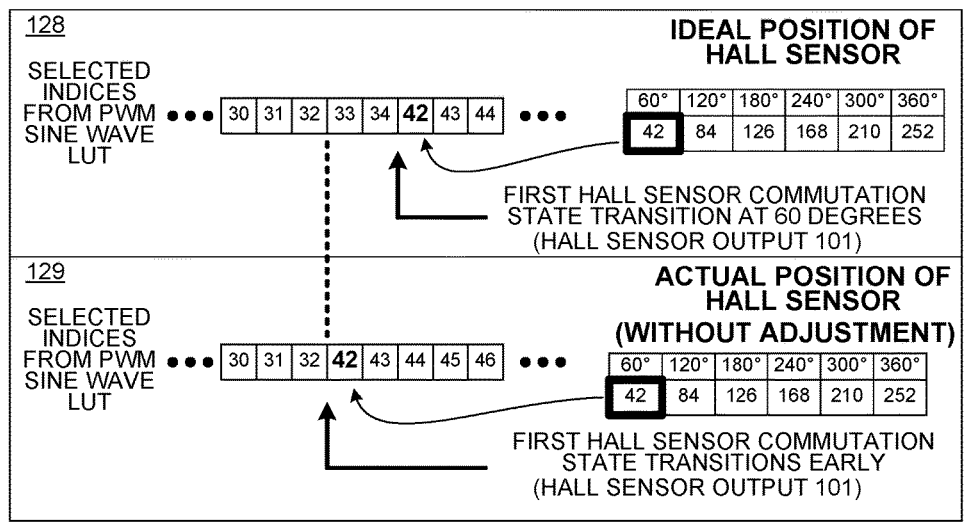
Figure 8:
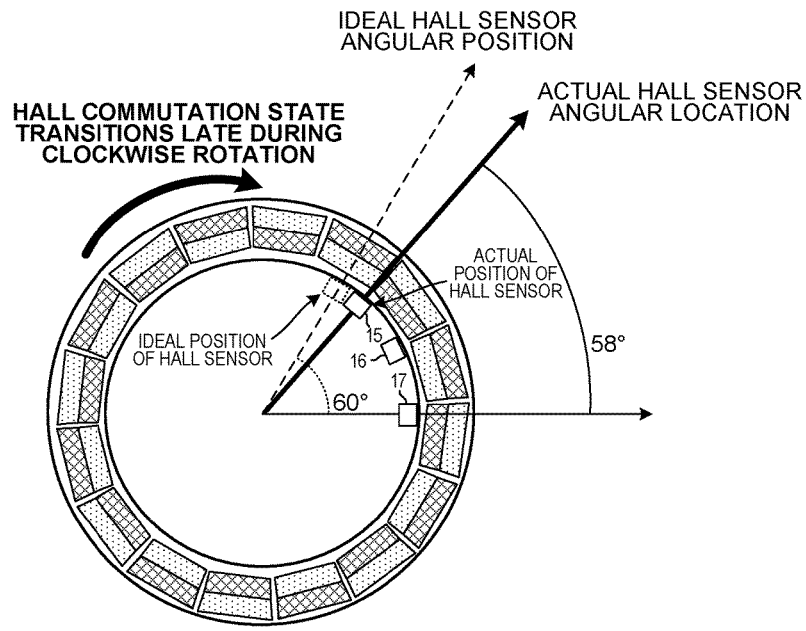
FIG. 8 shows an example of how asymmetries of the positions of the Hall sensors 15, 16, and 17 can cause the Hall sensor state values to transition too late during operation of the BLDC motor 2.
Figure 8:
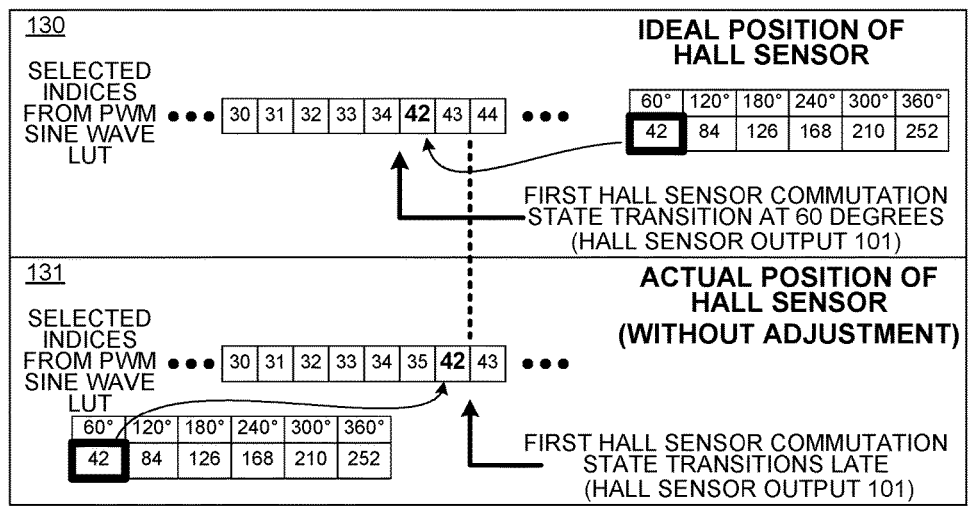

FIG. 6 is a more detailed diagram of controller integrated circuit 7 that shows how the PWM switch control signals are generated. The PWM switch control signals in FIG. 6 are generated without adjustment of reference phase angle values. The novel method of adjusting the reference phase angle values is not described for the moment in order to illustrate how the BLDC motor 2 may operate inefficiently without adjustment of the reference phase angle values. These inefficiencies are shown in FIGS. 7 and 8 and are typically caused by electro-mechanical asymmetries of the Hall sensors 15-17. The electro-mechanical asymmetries of the Hall sensors 15-17 may arise due to misplacement of the Hall sensors or asymmetries in the internal windings of the Hall sensors. The novel adjustment method shown in FIG. 9 compensates for any electro-mechanical asymmetries of the Hall sensors 15-17 resulting in more efficient motor operation. In this example, the novel adjustment method is performed using discrete hardware components. An implementation performed using machine readable instructions is shown in FIGS. 19A and 19B.

Stator winding voltages across the stator windings 42, 43, and 44 are shown in the waveform diagram at the top of FIG. 6. First stator winding voltage 101 is present on first stator winding 42 and has a maximum voltage of +VRECT and a minimum voltage of −VRECT. Second stator winding voltage 102 is present on second stator winding 43 and has a maximum voltage of +VRECT and a minimum voltage of −VRECT. Third stator winding voltage 103 is present on third stator winding 44 and has a maximum voltage of +VRECT and a minimum voltage of −VRECT. Supply voltage VRECT is output by the full wave rectifier bridge 4. Each of the first stator winding voltage 101, the second stator winding voltage 102, and the third stator winding voltage 103 is one-hundred and twenty degrees (120°) out of phase with respect to each other.

Each sixty degree (60°) phase represents a different commutation state of the three Hall sensors. Each electrical revolution of the stator winding voltages involves six commutation states. Upon detecting a change in commutation state, one of six reference phase angle values 104 is used to select a PWM input value from the PWM sine wave LUT 105. In this example, the PWM sine wave LUT 105 stores 256 8-bit PWM input values. Each of the reference phase angle values 104 is an index pointing to one of the 256 8-bit PWM input values. The reference phase angle values 104 are used to select PWM input values so that the rotor and stator remain in a ninety-degree (90°) phase relationship. Dashed lines identify sixty degrees (60°), one-hundred and twenty degrees (120°), one-hundred and eighty degrees (180°), two-hundred and forty degrees (240°), three-hundred degrees (300°), and three-hundred and sixty degrees (360°) in the stator winding voltages waveform.

When the Hall sensors 15-17 output a digital logic value of "101" or "5", a commutation state corresponding to a phase angle of sixty degrees (60°) is detected and an index value of "42" is to be used to select the next PWM input value from the PWM sine wave LUT 105. When the Hall sensors 15-17 output a digital logic value of "001" or "1", a commutation state corresponding to a phase angle of one-hundred and twenty degrees (120°) is detected and an index value of "84" is to be used to select the next PWM input value from the PWM sine wave LUT 105. When the Hall sensors 15-17 output a digital logic value of "011" or "3", a commutation state corresponding to a phase angle of one-hundred and eighty degrees (180°) is detected and an index value of "126" is to be used to select the next PWM input value from the PWM sine wave LUT 105. When the Hall sensors 15-17 output a digital logic value of "010" or "2", a commutation state corresponding to a phase angle of two-hundred and forty degrees (240°) is detected and an index value of "168" is to be used to select the next PWM input value from the PWM sine wave LUT 105. When the Hall sensors 15-17 output a digital logic value of "110" or "6", a commutation state corresponding to a phase angle of three-hundred degrees (300°) is detected and an index value of "210" is to be used to select the next PWM input value from the PWM sine wave LUT 105. When the Hall sensors 15-17 output a digital logic value of "100" or "4", a commutation state corresponding to a phase angle of three-hundred and sixty degrees (360°) is detected and an index value of "252" is to be used to select the next PWM input value from the PWM sine wave LUT 105.

A digital logic block 106 detects when the Hall sensor output changes indicating that the Hall sensor commutation state has changed. When the digital logic block 106 detects a change in the Hall sensor state value 107, one of the six reference phase angle values is to be used to select the next PWM input value from the PWM sine wave LUT 105. The digital logic block 106 receives the Hall sensor output signals 98, 98, and 100 corresponding to a Hall sensor state value 107. If the Hall sensor state value 107 changes, then digital logic block 106 asserts a one-bit digital logic signal 108 that in turn causes the 8-bit counter 110 to be loaded with an 8-bit value from multiplexer 109.

Multiplexer circuit 109 receives each of the six reference phase angle values 104 and outputs a selected value to counter 110. Which one of the six reference phase angle values it is that is output by multiplexer 109 is determined by the 3-bit Hall sensor state value 107.

Counter 110 receives the selected reference phase angle value 121, a one-bit digital logic signal 108 that is output by digital logic block 106, and a one-bit digital logic signal OVERFLOW 111 output by accumulator circuit 112. The one-bit digital logic signal 108 is supplied to the load bit terminal LD of the counter 110. The one-bit digital logic signal OVERFLOW 111 is supplied to the increment terminal INC of the counter 110. The counter 110 outputs a LUT input value 113 that is used to select a PWM input value from the PWM sine wave LUT 105.

An accumulator circuit 112 comprises a frequency controller 114, a summing circuit 115, and an 8-bit register 116. The frequency controller 114 receives control signal 88 via terminal 89 and generates a 8-bit digital value 117. The 8-bit digital value 117 is generated by summing the adjustment determined by control signal 88 by one and dividing the sum by a product of the PWM clock period and the look-up table (LUT) size. Summing circuit 115 sums the output 118 of 8-bit register 116 with the 8-bit digital value 117 to generate 8-bit digital sum value 119. The 8-bit digital sum value 119 is supplied to the 8-bit register 116. The 8-bit register 115 receives a PWM clock signal 120. In this example, PWM clock signal 120 has a period of fifty microseconds.

During operation, the counter 110 is incremented upon overflow of 8-bit register 116 which causes one-bit digital signal OVERFLOW 111 to be asserted to a digital logic high value. The LUT input value 113 output by counter 110 is used to select the PWM input value output by PWM sine wave LUT 105. The LUT input value 113 corresponds to an index of the PWM sine wave LUT 105.

Frequency controller 114 controls the rate the 8-bit register 116 overflows. In this example, the OFFSET value 124 of the frequency controller 112 is set by user input via a potentiometer (not shown). As the user increases a voltage output by the potentiometer, the value OFFSET 124 increases thereby causing controller integrated circuit 7 to step through the PWM sine wave LUT 105 at a higher rate resulting in higher RPM of BLDC motor 2 (assuming constant load). Depending on the value of the OFFSET, some PWM input values stored in the PWM sine wave LUT 105 may be skipped per PWM clock cycle. Such skipping may result in a lower resolution voltage sine wave across the stator windings. As the user decreases the voltage output by the potentiometer, the value OFFSET 124 decreases thereby causing controller integrated circuit 7 to step through the PWM sine wave LUT 105 at a lower rate resulting in lower RPM of BLDC motor 2 (assuming constant load). Depending on the value of the OFFSET, some PWM input values stored in the PWM sine wave LUT 105 may be used multiple times per PWM clock cycle.

Upon detecting that a Hall sensor state value 107 has changed, the selected reference phase angle value 121 is injected into the counter 110 and, in turn, is supplied to the PWM sine wave LUT 105. If, during operation of the BLDC motor 2, the rotor 39 is not in phase with the stator 40, for example, due to a load, then the selected reference phase angle value 121 is injected into the counter 110 and is used to select the appropriate PWM input value from the PWM sine wave LUT 105. The selected reference phase angle value 121 overwrites the digital value present in the counter thereby adjusting the rotor 39 to be in phase with the stator 40.

The PWM sine wave LUT 105 outputs a PWM input value 56 to the PWM circuit 24. The PWM input value 56 is used to generate the first stator winding voltage 101. A summing circuit 122 effectively phase shifts the PWM input value 56 by 120° to generate PWM input value 59 supplied to the PWM circuit 25. The PWM input value 59 is used to generate the second stator winding voltage 102. A summing circuit 123 effectively phase shifts the PWM input value 56 by −120° to generate PWM input value 62 supplied to the PWM circuit 26. The PWM input value 62 is used to generate the third stator winding voltage 103. The PWM input values are used to set a duty cycle register in each of the PWM circuits. The PWM circuit 24 has a duty cycle register 125. The PWM circuit 25 has a duty cycle register 126. The PWM circuit 26 has a duty cycle register 127.

FIG. 7 shows how asymmetries of the positions of the Hall sensors 15, 16, and 17 can cause the Hall sensor state values to transition too early during operation of the BLDC motor 2. For example, during counter-clockwise rotation of the rotor 39 of BLDC motor 2, if Hall sensor 15 is not positioned exactly sixty degrees (60°) from the Hall sensor 17 and is, for example, fifty-eight degrees (58°) from the Hall sensor 17, then Hall sensor state value will transition too early during rotation of rotor 39. Block 128 shows one ideal operation under a load condition. Each PWM sine wave value is selected until the PWM input value at index location "34" is selected. After selecting the PWM input value at index location "34", the Hall sensor state value changes which causes one of the reference phase angle values, for example, "42", to be used in selecting the next PWM input value. Assuming ideal Hall sensor placement, the reference angle value of "42" should be used to select the next PWM input value stored in the PWM sine wave LUT 105 after selecting the PWM input value at index location "34". The transition of the Hall sensor state value, however, assumes that the Hall sensor 15 is exactly sixty degrees (60°) from Hall sensor 17.

Block 129 shows the actual operation under the load condition where the Hall sensors 15, 16, and 17 are not exactly thirty degrees (30°) apart from each other. In this example, the Hall sensor state value transitions too early during the rotation of rotor 39. Instead of using reference phase angle value of "42" after selecting the PWM input value at index location "34", the reference phase angle value of "42" is selected after selecting the PWM input value at index location "32". Because the reference phase angle value is selected too early in the rotation of rotor 39, use of these reference phase angle values would not result in desired motor operation in which the stator 40 and rotor 39 have a ninety degrees (90°) phase difference.

FIG. 8 shows an example of how asymmetries of the positions of the Hall sensors 15, 16, and 17 can cause the Hall sensor state values to transition too late during operation of the BLDC motor. For example, during clockwise rotation of the rotor 39 of BLDC motor 2, if the Hall sensor 15 is not positioned exactly sixty degrees (60°) from the Hall sensor 17 and is, for example, fifty-eight degrees (58°) from the Hall sensor 17, then Hall sensor state value will transition too late during rotation of rotor 39. Block 130 shows one ideal operation under a load condition. Each PWM sine wave value is selected until the PWM input value at index location "34" is selected. After selecting the PWM input value at index location "34", the Hall sensor state value changes which causes one of the reference phase angle values, for example, "42", to be used in selecting the next PWM input value. Assuming ideal Hall sensor placement, the reference angle value of "42" should be selected and used to select the next PWM input value stored in the PWM sine wave LUT 105 after selecting the PWM input value at index "34". The transition of the Hall sensor state value assumes, however, that the Hall sensor 15 is exactly sixty degrees (60°) from Hall sensor 17.

Block 131 shows the actual operation under the load condition where the Hall sensors 15, 16, and 17 are not exactly thirty degrees (30°) apart from each other. In this example, the Hall sensor state value transitions too late during the rotation of rotor 39. Instead of using reference phase angle value of "42" after selecting the PWM input value at index location "34", the reference phase angle value of "42" is selected after selecting the PWM input value at index location "35". Because the reference phase angle value is selected too late in the rotation of rotor 39, use of these reference phase angle values would not result in desired motor operation in which the stator 40 and rotor 39 have a ninety degrees (90°) phase difference.

Figure 9:
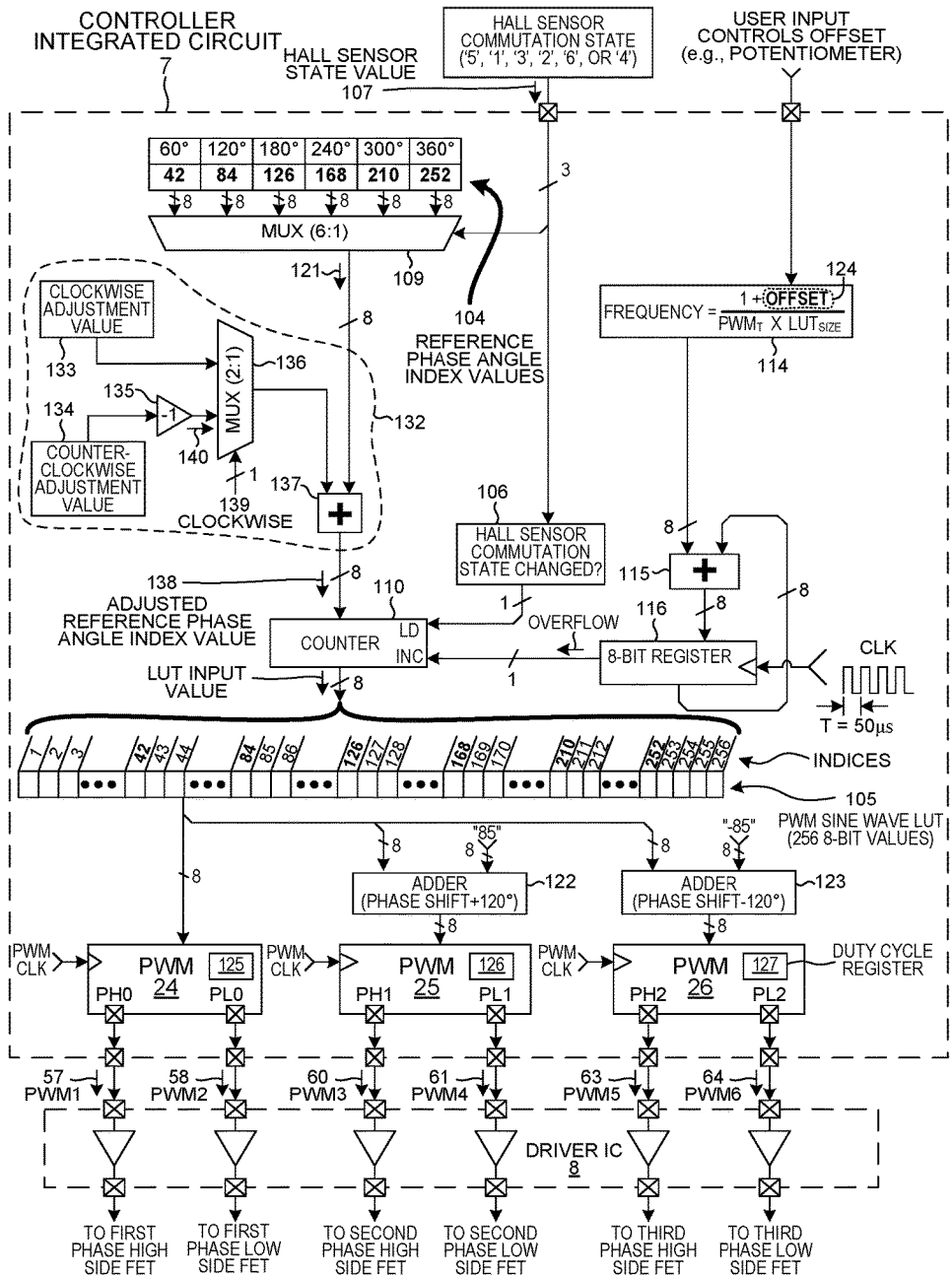
FIG. 9 is a detailed diagram of a controller integrated circuit 7 that uses adjusted reference phase angle values to compensate for electro-mechanical asymmetries associated with the Hall sensors 15, 16, and 17.

FIG. 9 is a detailed diagram of a controller integrated circuit 7 that uses adjusted reference phase angle values to compensate for electro-mechanical asymmetries associated with the Hall sensors 15, 16, and 17. The controller integrated circuit 17 includes novel reference phase angle adjustment circuit 132. The reference phase angle adjustment circuit 132 comprises a clockwise reference phase angle adjustment value 133, a counter-clockwise reference phase angle adjustment value 134, an inverter 135, a 2:1 multiplexer circuit 136, and a summing circuit 137. The reference phase angle adjustment circuit receives the 8-bit reference phase angle value 121 output by the 6:1 multiplexer circuit 109, and generates an adjusted reference phase angle value 138 that is supplied to the counter 110.

In accordance with one novel aspect, the adjusted reference phase angle value 138 compensates for early transition of the Hall sensor state value 107. If the rotor is rotating in a counter-clockwise direction, then a one-bit digital signal 139 indicative of rotation causes the multiplexer circuit 136 to select the counter-clockwise reference phase angle adjustment value 134. The counter-clockwise reference phase angle adjustment value 134 is supplied to inverter 135, and an inverted version 140 is supplied to the summing circuit 137. The summing circuit 137 sums the counter-clockwise reference phase angle adjustment value 134 and the 8-bit selected reference phase angle value 121. The sum of the counter-clockwise reference phase angle adjustment value 134 and the 8-bit selected reference phase angle value 121 is used to generate the adjusted reference phase angle value 138.

In accordance with another novel aspect, the adjusted reference phase angle value 138 compensates for late transition of the Hall sensor state value 107. If the rotor is rotating in a clockwise direction, then a one-bit digital signal 139 indicative of rotation causes the multiplexer circuit 136 to select the clockwise reference phase angle adjustment value 133. The clockwise reference phase angle adjustment value 133 is supplied to the summing circuit 137. The summing circuit 137 sums the clockwise reference phase angle adjustment value 133 and the 8-bit selected reference phase angle value 121. The sum of the clockwise reference phase angle adjustment value 133 and the 8-bit selected reference phase angle value 121 is used to generate the adjusted reference phase angle value 138.

Figure 10:
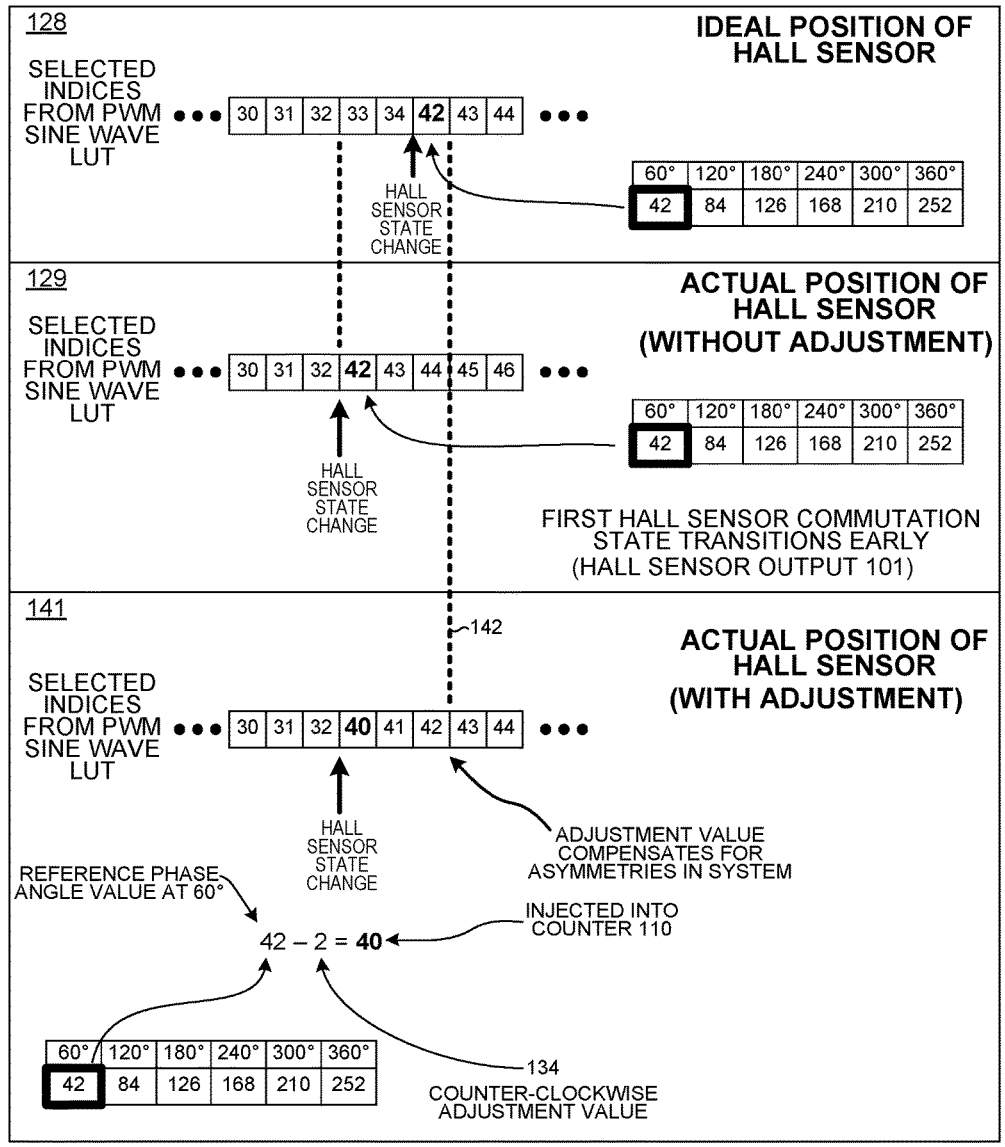
FIG. 10 is a diagram showing how the counter-clockwise adjustment value 134 compensates for early transition of the Hall sensor state value 107 thereby maintaining desired motor operation.

FIG. 10 is a diagram showing how the counter-clockwise reference phase angle adjustment value 134 compensates for early transition of the Hall sensor state value 107 thereby maintaining desired motor operation. In block 141, the inverted version of the counter-clockwise reference phase angle adjustment value 134 "−2" is combined with the early selected reference phase angle value of "42" to obtain an adjusted reference phase angle value of "40". The adjusted reference phase angle value of "40" is used to select the next PWM input value from the PWM sine wave LUT 105. As dashed line 142 shows in FIG. 10, the adjusted reference phase angle value ensures that the PWM sine wave LUT is traversed in accordance with how the PWM sine wave LUT would have been traversed in the ideal case of block 128.

Figure 11:
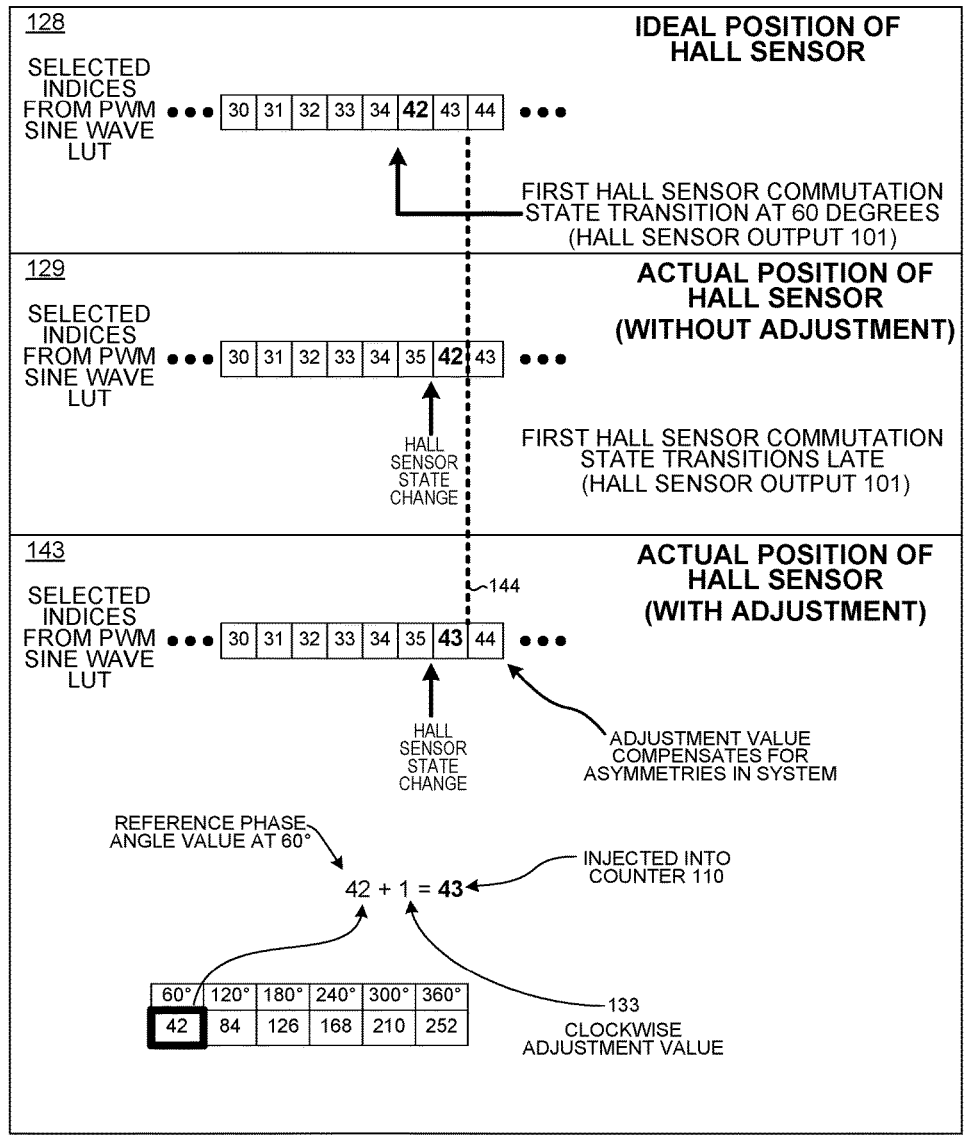
FIG. 11 is a diagram that shows how the clockwise reference phase angle adjustment value 133 compensates for late transition of the Hall sensor state value 107 thereby maintaining desired motor operation.

FIG. 11 is a diagram that shows how the clockwise reference phase angle adjustment value 133 compensates for late transition of the Hall sensor state value 107 thereby maintaining desired motor operation. In block 143, the clockwise reference phase angle adjustment value 133 "1" is combined with the late selected reference phase angle value of "42" to obtain an adjusted reference phase angle value of "43". The adjusted reference phase angle value of "43" is used to select the next PWM input value from the PWM sine wave LUT 105. As dashed line 144 shows in FIG. 11, the adjusted reference phase angle value ensures that the PWM sine wave LUT is traversed in accordance with how the PWM sine wave LUT would have been traversed in the ideal case of block 130.

Figure 12:
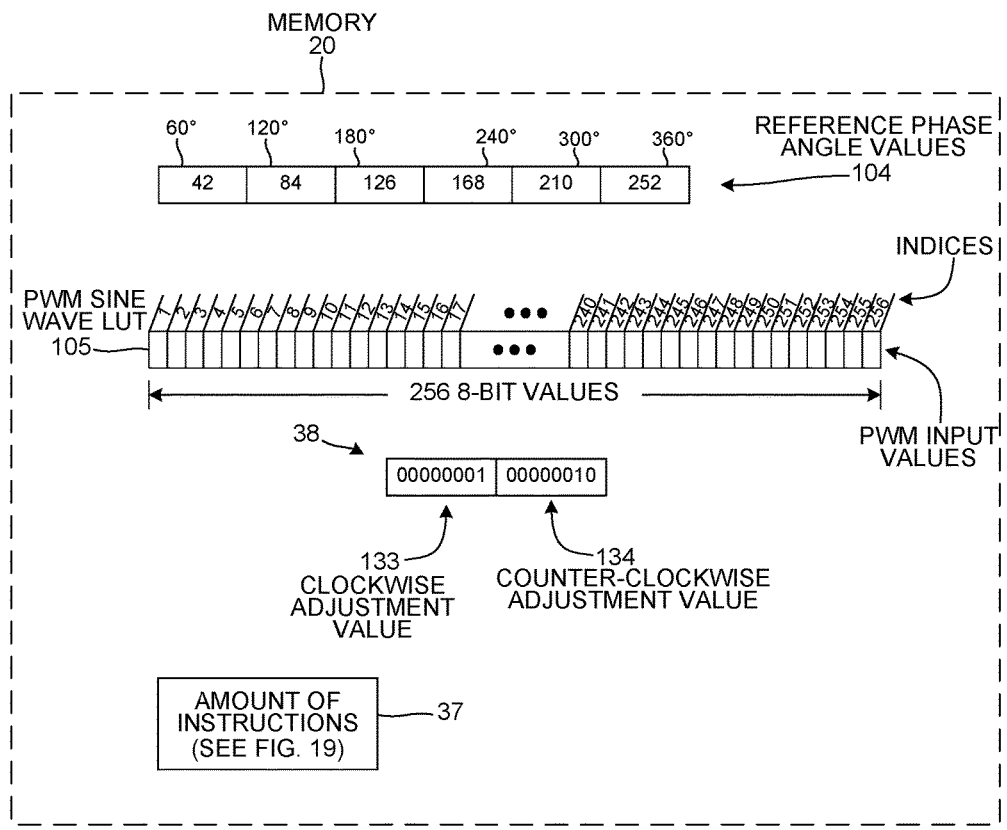
FIG. 12 is a conceptual diagram of the contents of memory 20 of controller integrated circuit 7.

FIG. 12 is a conceptual diagram of the contents of memory 20 of controller integrated circuit 7. Memory 20 is a processor-readable medium that stores the reference phase angle values 104, the PWM sine wave LUT 105, the amount of instructions 38, and the reference phase angle adjustment values 38. In this example, the reference phase angle adjustment values 38 comprise a clockwise reference phase angle adjustment value 133 and a counter-clockwise reference phase angle adjustment value 134. In another embodiment, there is one and only one adjustment value that is stored and used in controlling BLDC motor 2. The reference phase angle adjustment values 38 are stored in volatile memory. In other embodiments, the reference phase angle adjustment values 38 are stored in non-volatile memory. In this example, the amount of instructions 38 is an amount of C instructions shown in FIGS. 19A and 19B. In another example, the amount of instructions 38 is realized as a discrete amount of hardware as shown in FIG. 9 without involving any instructions interpreted by a processor.

In another embodiment, the reference phase angle values 104 are updated with the reference phase angle adjustment values obtained during a calibration step. For example, if after the calibration is performed and the determined adjustment value is "1", then the reference phase angle values 104 are updated by adding or subtracting the determined adjustment value of "1" from the reference phase angle values 104. The modified reference phase angle values 104 are used in controller the BLDC motor 2. No separate adjustment values are stored in memory.

Figure 13:
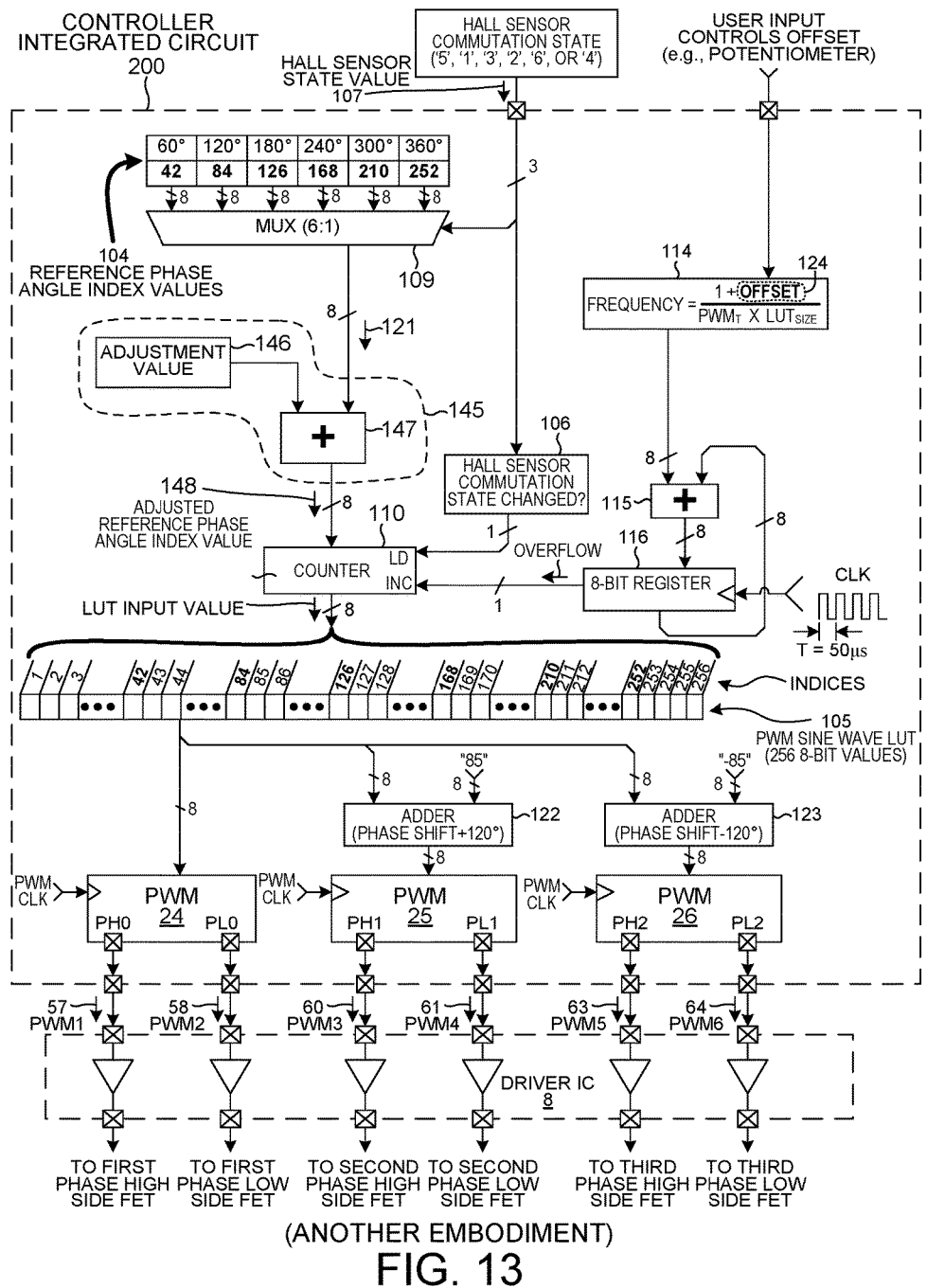
FIG. 13 is a diagram of another embodiment in which a single reference phase angle value is stored and is used in controlling the BLDC motor 2.

FIG. 13 is a diagram of another embodiment in which a single reference phase angle value is stored and is used in controlling the BLDC motor 2. A reference phase angle adjustment circuit 145 comprises a reference phase angle adjustment value 146 and a summing circuit 147. The reference phase angle adjustment circuit receives the 8-bit reference phase angle value 121 output by the 6:1 multiplexer circuit 109, and generates an adjusted reference phase angle value 148 that is supplied to the counter 110. The reference phase angle adjustment value 146 is the only adjustment value used by the reference phase angle adjustment circuit 145. The reference phase angle adjustment value 146 is used to control the BLDC motor 2 in both clockwise and counter-clockwise operation.

Figure 14:
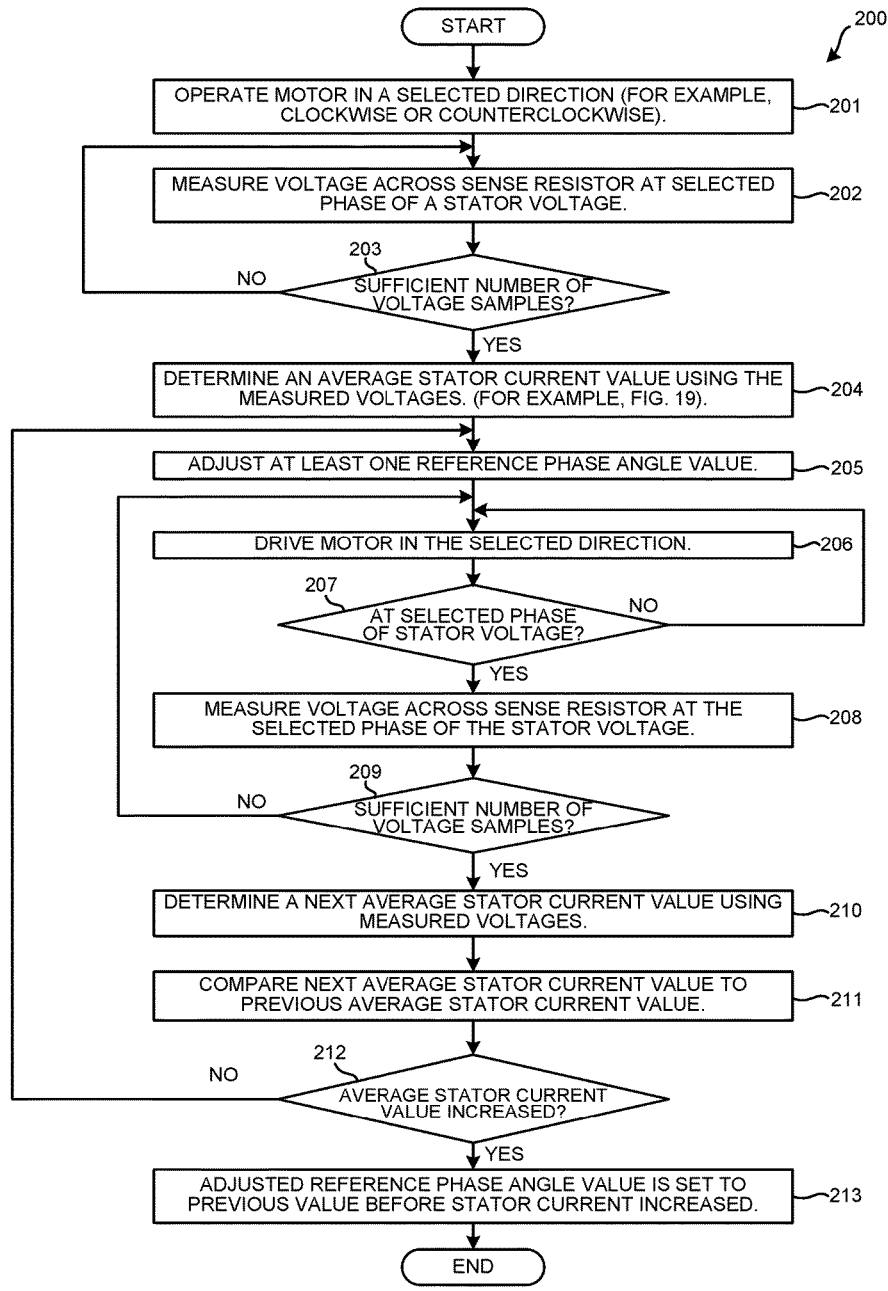
FIG. 14 is a flowchart of a method 200 of determining an adjusted reference phase angle value.

FIG. 14 is a flowchart of a method 200 of determining an adjusted reference phase angle value. The determined adjusted reference phase angle value is usable to control the BLDC motor 2 so that a desired motor operation results. In one example, desired motor operation is a minimal amount of current consumption for a given load condition where the motor operates at a substantially constant load and at a substantially constant speed.

In a first step (step 201), a BLDC motor is operated in a selected direction. The direction is a clockwise direction or a counter-clockwise direction. The method 200 is performed consistently with the selected direction. For example, in FIG. 1, the BLDC motor 2 is operated in a selected direction.

In a second step (step 202), a voltage is measured across a sense resistor at a selected phase of a stator voltage. For example, in FIG. 1, the current sense circuitry 22 is used to sense a voltage across sense resistor 18. The voltage is sensed at a selected phase of stator winding voltages 101, 102, and 103 shown in FIG. 6. Subsequent voltages are sensed at the specific phase of the stator winding voltages 101, 102, and 103 so that the voltage measurements can be meaningfully averaged and compared to obtain a valid average stator current value.

Figure 15:
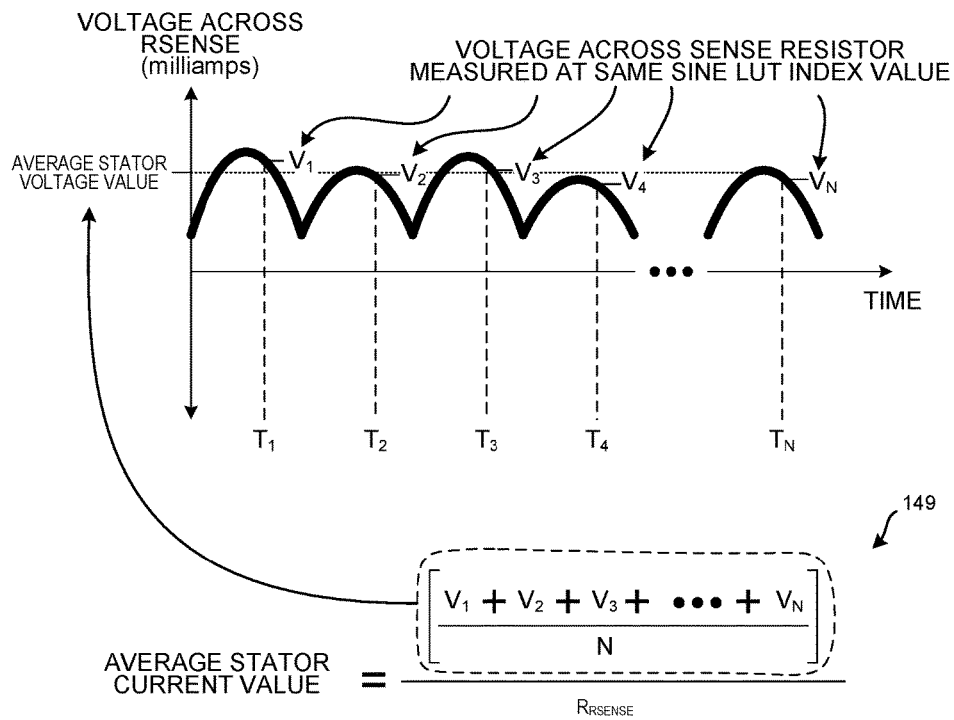
FIG. 15 is a diagram showing how an average stator current value is determined from measured voltages across the sense resistor.

In a third step (step 203), a determination is made as to whether a sufficient number of voltage samples have been taken. If a sufficient number of voltage samples have not been taken, then additional voltage measurements are obtained in step 203. For example, in FIG. 15, voltages V1 through VN are sensed. The voltages V1 through VN are present across the sense resistor 18. The voltages V1 through VN are each proportional to the stator current ISTATOR 83. If a sufficient number of voltage samples have been obtained, then the method proceeds to step 204.

Figure 16:
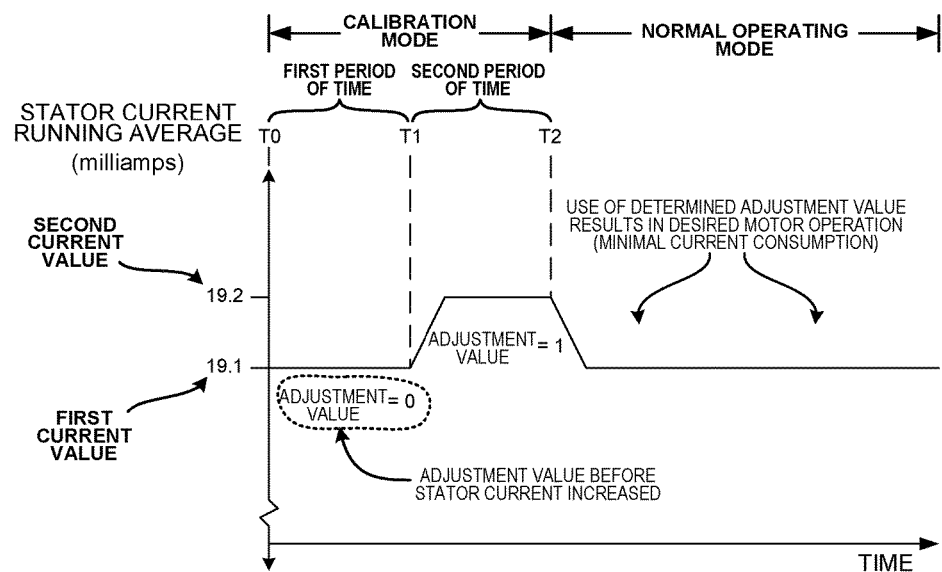
FIG. 16 is a diagram showing a first example of a motor operating in the calibration mode and then in the normal operating mode.
Figure 17:
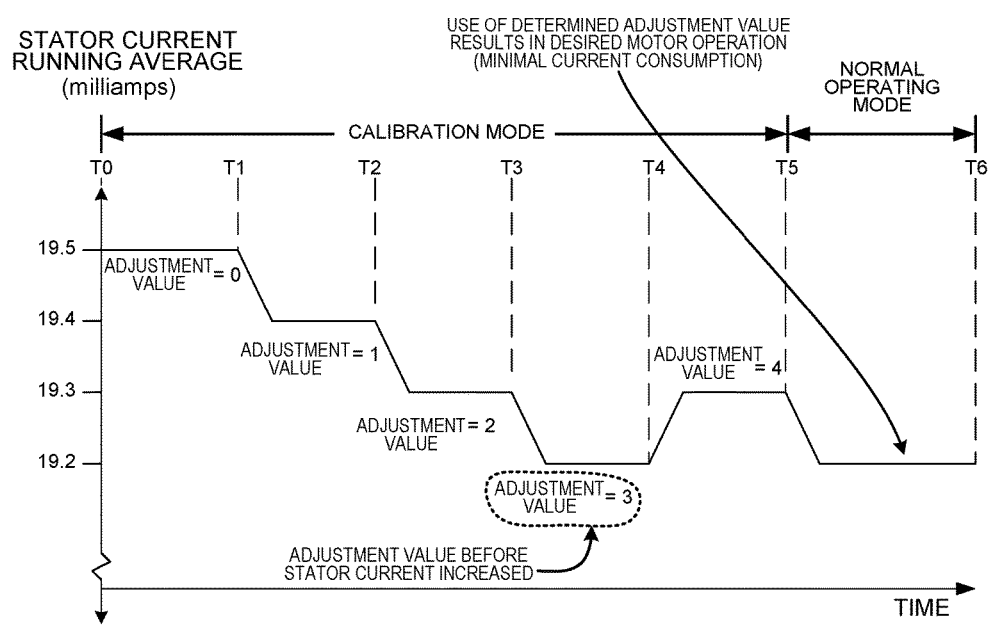
FIG. 17 is a diagram showing a second example of a motor operating in the calibration mode and then in the normal operating mode.

In a fourth step (step 204), an average stator current value is determined using the measured voltages in step 202. For example, in FIG. 15, the average stator current value is obtained from equation 149. The sum of measured voltages V1 through VN is divided by the number of voltage samples measured to obtain an average stator voltage value. The average stator voltage value is divided by a resistance of sense resistor RSENSE 18 to obtain the average stator current value. In the example of FIG. 16, during a first period of time between T0 and T1 where a reference phase angle adjustment value is zero ("0"), the average stator current value is determined to be 19.1 milliamps. In the example of FIG. 17, during a first period of time between T0 and T1 where a reference phase angle adjustment value is zero ("0"), the average stator current value is determined to be 19.5 milliamps.

In a fifth step (step 205), at least one reference phase angle value is adjusted. In the example of FIG. 16, at least one of the reference phase angle values 104 is adjusted by one "1" integer value at time T1. The adjustment value is increased from "0" to "1" between T1 and T2. In the example of FIG. 17, at least one of the reference phase angle values 104 is adjusted by one "1" integer value at time T1. The adjustment value is increased from "0" to "1" between T1 and T2.

In a sixth step (step 206), the motor is driven in the selected direction. For example, in FIG. 1, the BLDC motor 2 is operated in the selected direction.

In a seventh step (step 207), a determination is made as to whether the selected phase of the stator voltage has been reached. If not, then the motor is continually driven in the selected direction until the selected phase of the stator voltage is reached. For example, the BLDC motor 2 is driven until the selected phase of the stator winding voltage is reached. If the selected phase of the stator voltage has been reached, then the method proceeds to step 208.

In an eighth step (step 208), a voltage is measured across the sense resistor at the selected stator voltage phase. For example, in FIG. 1, the current sense circuitry 22 is used to sense a voltage across sense resistor 18. The voltage is sensed at the selected phase of the stator winding voltages 101, 102, and 103 shown in FIG. 6.

In a ninth step (step 209), a determination is made as to whether a sufficient number of voltage samples have been taken. If a sufficient number of voltage samples have not been taken, then additional voltage measurements are obtained in step 208 after determining that the stator voltage phase has been reached in step 207. For example, in FIG. 15, voltages V1 through VN are sensed. The voltages V1 through VN are present across the sense resistor 18. The voltages V1 through VN are each proportional to the stator current ISTATOR 83. If a sufficient number of voltage samples have been obtained, then the method proceeds to step 210.

In a tenth step (step 210), a next average stator current value is determined using the measured voltages in step 208. For example, in FIG. 15, the next average stator current value is obtained from equation 149. The sum of measured voltages V1 through VN is divided by the number of voltage samples measured in step 207 to obtain an average stator voltage value. The average stator voltage value is divided by a resistance of sense resistor RSENSE 18 to obtain the next average stator current value. In the example of FIG. 16, during a second period of time between T1 and T2 where the reference phase angle adjustment value is one ("1"), the average stator current value is determined to be 19.2 milliamps. In the example of FIG. 17, during a second period of time between T1 and T2 where the reference phase angle adjustment value is one ("1"), the average stator current value is determined to be 19.4 milliamps.

In an eleventh step (step 211), the next average stator current value determined in step 210 is compared to the previous determined average stator current value. In the example of FIG. 16, the next average stator current value of 19.2 milliamps determined between T2 and T1 is compared the previous average stator current value of 19.1 milliamps determined between T1 and T0. In the example of FIG. 17, the next average stator current value of 19.4 milliamps determined between T2 and T1 is compared the previous average stator current value of 19.5 milliamps determined between T1 and T0.

In a twelfth step (step 212), a determination is made as to whether the average stator current value increased. If the next average stator current value is greater than the previous average stator current value, then the method 200 proceeds to the final step of 213. For example, in FIG. 16, the next average stator current value of 19.2 milliamps is determined between T2 and T1 is greater than the previous average stator current value of 19.1 milliamps determined between T1 and T0. The method 200 next proceeds to the final step 213.

If, on the other hand, the next average stator current value is not greater than the previous average stator current value, then the method 200 proceeds to step 205. The reference phase angle values are adjusted (step 205), the motor is driven in the selected direction (step 206) until the selected stator voltage phase is reached (step 207), voltages across the sense resistor are measured (step 208) until enough samples are obtained (step 209), and a next average stator current value is obtained (step 210) and compared to the previous average stator current value (step 211). Steps 205 through 211 are repeated until the next average stator current value is greater than the previous average stator current value. For example, in FIG. 17, the adjustment values are incremented and an average stator voltage is obtained for each time period until the time period between T4 and T5 in which the average stator current increases to 19.3 milliamps.

In a thirteenth step (step 213), the adjusted reference phase angle value is the reference phase angle value selected prior to the reference phase angle value that caused the average stator current value to increase. For example, in FIG. 16, the adjustment value of zero ("0") is used in obtaining the adjusted reference phase angle value because the adjustment value of "0" resulted in a minimal average stator current value of 19.2 milliamps. In the example of FIG. 17, the adjustment value of "3" is used in obtaining the adjusted reference phase angle value because the adjustment value of three ("3") resulted in a minimal average stator current value of 19.2 milliamps.

Figure 18:
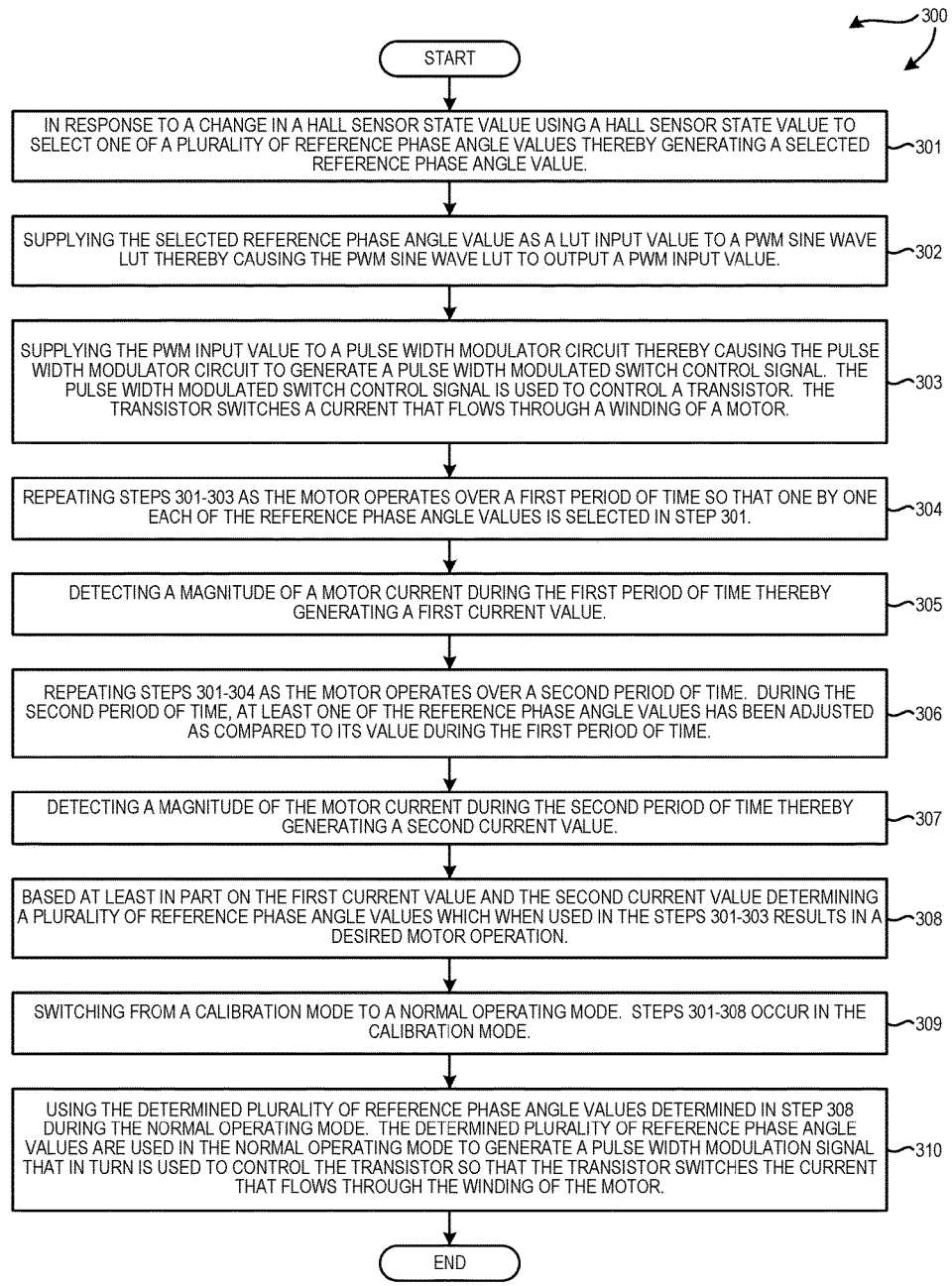
FIG. 18 is a flowchart of a method 300 in accordance with another novel aspect.

FIG. 18 is a flowchart of a method 300 in accordance with another novel aspect. In a first step (step 301), a Hall sensor state value is used to select one of a plurality of reference phase angle values in response to a change in a Hall sensor state value thereby generating a selected reference phase angle value. For example, in FIG. 9, a Hall sensor state value 107 selects one of the six reference phase angle values 104. The logic block 106 detects that Hall sensor state value has changed. In response, block 106 asserts the load terminal of the counter 110. The reference phase angle adjustment values 133,134 are initially zero.

In a second step (302), the selected reference phase angle value is supplied as a LUT input value to a PWM sine wave LUT thereby causing the PWM sine wave LUT to output a PWM input value. For example, in FIG. 9, the selected reference phase angle value 121 is supplied to the summing circuit 137 and initially summed with zero ("0"). The selected reference phase angle value 121 is supplied to the counter 110 which, in turn, supplies the selected reference phase angle value 121 to the PWM sine wave LUT 105. The PWM sine wave LUT 105 outputs a PWM input value 56.

In a third step (303), the PWM input value is supplied to a pulse width modulated (PWM) circuit to generate a pulse width modulated switch control signal. The pulse width modulated switch control signal is used to control a transistor. The transistor switches a current that flows through a winding of a motor. For example, in FIG. 9, the PWM input value 56 is supplied to the PWM circuit 56. The PWM circuit 56 generates a PWM switch control signal PWM1 57. The PWM switch control signal PWM1 57 is used to control high side N-channel field effect transistor 9 shown in FIG. 1. The transistor 9 switches a current 151 flowing through first winding 42 of stator 40 of the BLDC motor 2.

In a fourth step (step 304), steps 301, 302, and 303 are repeated as the motor operates over a first period of time so that one by one each of the reference phase angle values is selected in step 301. For example, in FIG. 16, the motor is operated during a first period of time between T0 and T1. Each of the six reference phase angles is selected during the first time period between T0 and T1.

In a fifth step (step 305), a magnitude of a motor current during the first period of time is detected thereby generating a first current value. For example, in FIG. 16, during the first period of time between T1 and T0, a motor current ISTATOR 83 (shown in FIG. 1) is detected to obtain a first current value of 19.1 milliamps. In the example of FIG. 17, during a first period of time between T1 and T0, a motor current ISTATOR 83 (shown in FIG. 1) is detected to obtain a first current value of 19.5 milliamps.

In a sixth step (step 306), steps 301, 302, 303, and 304 are repeated as the motor operates over a second period of time. During the second period of time, at least one of the reference phase angle values has been adjusted as compared to its value during the first period of time. For example, in FIG. 9, the reference phase angle adjustment circuit 132 adjusts the selected reference phase angle value 121 and supplies the adjusted reference phase angle value 138 to the counter 110. The counter 110, in turn, supplies the adjusted reference phase angle value 138 to the PWM sine wave LUT 105. In response, the PWM sine wave LUT 105 outputs the PWM input value 56. In the example of FIG. 16, during a second period of time between T2 and T1, an adjustment value of one ("1") is used to adjust the at least one of the reference phase angle values. In the example of FIG. 17, during a second period of time between T2 and T1, an adjustment value of one ("1") is used to adjust the at least one of the reference phase angle values.

In a seventh step (step 307), a magnitude of the motor current during the second period of time is detected thereby generating a second current value. For example, in FIG. 16, during the second period of time between T2 and T1, a motor current ISTATOR 83 (shown in FIG. 1) is detected to obtain a second current value of 19.2 milliamps. In the example of FIG. 17, during the second period of time between T2 and T1, a motor current ISTATOR 83 (shown in FIG. 1) is detected to obtain a second current value of 19.4 milliamps.

In an eighth step (step 308), determining a plurality of reference phase angle values based at least in part on the first current value and the second current value. The determined plurality of reference phase angle values result in a desired motor operation when used in steps 301, 302 and 303. For example, in FIG. 16, the second current value of 19.2 milliamps is greater than the first current value of 19.1 milliamps. Based on the first current value and second current value, the adjustment value of zero ("0") results in less current consumption. Maintaining the reference phase angle values at their initial values (or adjusting each of the reference phase angle values by zero) results in the desired motor operation.

In the example of FIG. 17, the second current value of 19.4 milliamps is less than the first current value of 19.5 milliamps. The second current value results in less current consumption. An adjustment value of three ("3") results in the least amount of current consumptions. Adjusting each of the reference phase angle values by three ("3") results in the desired motor operation.

In a ninth step (309), a calibration mode is switched to a normal operating mode. The steps of 301-308 occur in the calibration mode. For example, in FIG. 9, steps of 301 through 308 are repeated until adjustment values 133 and 134 are determined for the BLDC motor 2.

In a tenth step (310), the determined plurality of reference phase angle values determined in step 308 are used in the normal operating mode. The determined plurality of reference phase angle values are used in the normal operating mode to generate a pulse width modulation signal that in turn is used to control the transistor so that the transistor switches the current that flows through the winding of the motor. For example, in FIG. 9, the reference phase angle adjustment circuit 132 uses the determined adjustment values 133 and 134 during the normal operating mode of the motor 2 to adjust the selected reference phase angle values 121. The selected reference phase angle values 121 are supplied to the summing circuit 137 and summed with adjustment value 133 or an inverted version 140 of adjustment value 134. The selected reference phase angle values 121 are supplied to the counter 110 which, in turn, supplies the selected reference phase angle values 121 to the PWM sine wave LUT 105. The PWM sine wave LUT 105 outputs PWM input values 56. The PWM input values 56 are supplied to the PWM circuit 56. The PWM circuit 56 generates a PWM switch control signal PWM1 57. The PWM switch control signal PWM1 57 is used to control high side N-channel field effect transistor 9 shown in FIG. 1. The transistor 9 switches a current 151 flowing through first winding 42 of stator 40 of the BLDC motor 2.

FIG. 19 includes FIGS. 19A and 19B which together show an amount of processor-executable instructions. When processor 21 executes these instructions, average current values are obtained and compared to prior obtained average current values, an adjustment value is increased repeatedly until an obtained average current value is greater than a prior obtained average current value, and the adjustment value prior to current increase is stored in non-volatile memory. Portion 152 of the instructions are used to obtain the current values used to compare motor current after adjusting at least one of the reference phase angle values. IF statement 153 ensures that the motor speed has settled under a constant load condition so that a current value can be obtained. In this example, a variable MAX_INCREMENTS is set to five ("5") and assumes that no more than five ("5") increments of the reference phase angle values will be involved in performing the calibration. WHILE loop 154 causes the reference phase angle values to be adjusted until BREAK statement 155 when calibration is deemed complete. The reference phase angle values are adjusted until the IF control statement 156 determines that the next current value 157 is greater than the prior current value 158. Once the next current value 157 exceeds the prior current value 158, then the adjusted reference phase angle values resulting in the desired motor operation have been determined. In the case of clockwise rotation, the calibration is flagged as complete at assignment statement 159 and portion 160 stores the clockwise adjustment value 133 in non-volatile memory. In the case of counter-clockwise rotation, the calibration is flagged as complete at assignment statement 161 and portion 162 stores the counter-clockwise adjustment value 134 in non-volatile memory.

Although certain specific embodiments are described above for instructional purposes, the teachings of this patent document have general applicability and are not limited to the specific embodiments described above. The function of the hardware circuitry illustrated in FIGS. 1, 6, 9, and 13 can be implemented in hardware circuitry as shown, or in a combination of dedicated hardware circuitry and software, or largely in software. This applies to individual blocks or portions of the diagrams. For example, a counter such as counter 110 can be a hardware counter, or can be a counter implemented in software code. Likewise, a LUT such as PWM sine wave LUT 105 can be a hardware LUT, or can be a LUT implemented in software code. Certain of the illustrated blocks can be implemented with dedicated hardware and other ones of the blocks can be implemented in software. Accordingly, various modifications, adaptations, and combinations of various features of the described embodiments can be practiced without departing from the scope of the invention as set forth in the claims.

What is claimed is:

1. A method comprising:
(a) in response to a change in a Hall sensor state value using a Hall sensor state value to select one of a plurality of reference phase angle values thereby generating a selected reference phase angle value;
(b) supplying the selected reference phase angle value as a Lookup Table (LUT) input value to a Pulse Width Modulation (PWM) sine wave LUT thereby causing the PWM sine wave LUT to output a PWM input value;
(c) supplying the PWM input value to a pulse width modulator circuit thereby causing the pulse width modulator circuit to generate a pulse width modulated switch control signal, wherein the pulse width modulated switch control signal is used to control a transistor, wherein the transistor switches a current that flows through a winding of a motor;
(d) repeating steps (a), (b) and (c) as the motor operates over a first period of time so that one by one each of the reference phase angle values is selected in (a);
(e) detecting a magnitude of a motor current during the first period of time thereby generating a first current value;
(f) repeating steps (a), (b), (c) and (d) as the motor operates over a second period of time, wherein during the second period of time at least one of the reference phase angle values has been adjusted as compared to its value during the first period of time;
(g) detecting a magnitude of the motor current during the second period of time thereby generating a second current value;
(h) based at least in part on the first current value and the second current value determining a plurality of reference phase angle values which when used in the steps (a), (b), (c) results in a motor operation;
(i) switching from a calibration mode to a normal operating mode, wherein steps (a)-(h) occur in the calibration mode; and
(j) during the normal operating mode using the determined plurality of reference phase angle values determined in (h), wherein the determined plurality of reference phase angle values are used in the normal operating mode to generate a pulse width modulation signal that in turn is used to control the transistor so that the transistor switches the current that flows through the winding of the motor.

2. The method of claim 1, wherein the generation of the selected reference phase angle value in (a) during the second period of time involves:
(a1) using a Hall sensor state value to identify one of the reference phase angle values; and
(a2) adding an adjustment value to the identified reference phase angle value identified in (a1) thereby generating the selected reference phase angle value that is then later supplied as the LUT input value to the PWM sine wave LUT.

3. The method of claim 1, wherein the generation of the selected reference phase angle value in (a) during the second period of time involves:
(a1) using a Hall sensor state value to identify one of the reference phase angle values; and
(a2) subtracting an adjustment value from the identified reference phase angle value identified in (a1) thereby generating the selected reference phase angle value that is then later supplied as the LUT input value to the PWM sine wave LUT.

4. The method of claim 1, wherein after the selected reference phase angle value is supplied as the LUT input value in (b) to the PWM sine wave LUT, the LUT input value is incremented and the incremented LUT input value is supplied as a subsequent input to the PWM sine wave LUT, and wherein the LUT input value is incremented a plurality of times before the Hall sensor state value changes the next time.

5. The method of claim 1, wherein the motor operation is an operation of the motor during which the magnitude of the motor current is at a minimum for calibration mode operation of the motor under a constant load and at a constant speed.

6. The method of claim 1, wherein the detecting the magnitude of the motor current is a running average of motor currents during a period of time.

7. The method of claim 1, wherein the plurality of reference phase angle values comprises:
a first reference phase angle index value, wherein the first reference phase angle index value corresponds to a first Hall sensor commutation state;
a second reference phase angle index value, wherein the second reference phase angle index value corresponds to a second Hall sensor commutation state;
a third reference phase angle index value, wherein the third reference phase angle index value corresponds to a third Hall sensor commutation state;
a fourth reference phase angle index value, wherein the fourth reference phase angle index value corresponds to a fourth Hall sensor commutation state;
a fifth reference phase angle index value, wherein the fifth reference phase angle index value corresponds to a fifth Hall sensor commutation state; and
a sixth reference phase angle index value, wherein the sixth reference phase angle index value corresponds to a sixth Hall sensor commutation state.

8. The method of claim 1, wherein the motor is a BrushLess Direct Current (BLDC) motor, and wherein the plurality of reference phase angle values is used to synchronize a phase angle between a rotor of the BLDC motor and a stator of the BLDC motor during operation of the BLDC motor.

9. The method of claim 1, wherein the detecting of the motor current involves using a sense resistor to measure a stator current, and wherein the sense resistor has a lead coupled to a sense terminal of an integrated circuit.

10. The method of claim 1, further comprising:
(k) replacing the plurality of reference phase angle values of (a) with the plurality of reference phase angle values determined in (h) in the calibration mode which results in the motor operation, wherein the plurality of reference phase angle values determined in the calibration mode are stored in a non-volatile memory, and wherein (k) occurs after (h) and before (i).

11. A system comprising:
a supply node;
a ground node;
a motor having a rotor and a stator, wherein the stator includes a first stator winding, a second stator winding, and a third stator winding;
a plurality of Hall sensors, wherein each of the Hall sensors outputs a Hall sensor output value;
a plurality of switching transistors, wherein each of the plurality of switching transistors is coupled to receive a gate drive signal, wherein the plurality of switching transistors is coupled between the supply node and the ground node, and wherein each of the switching transistors switches a current through the motor;
a gate driver circuit coupled to receive a plurality of control signals and to output gate drive signals that control the plurality of switching transistors; and a controller integrated circuit, wherein the controller integrated circuit is configurable to store reference phase angle values, a Pulse Width Modulation (PWM) sine wave Lookup Table (LUT), and wherein the controller integrated circuit is configurable to determine an adjusted reference phase angle value by:
(a) operating the motor in a selected direction;
(b) detecting a motor current to determine a current value;
(c) adjusting the reference phase angle value;
(d) repeating the operating of (a), the detecting of (b), and the adjusting of (c) until a detected current value is greater than a previous detected current value; and
(e) storing the adjusted reference phase angle value.

12. The system of claim 11, wherein the motor is a BrushLess Direct Current (BLDC) electric motor.

13. The system of claim 11, wherein the PWM sine wave LUT stores PWM input values, wherein the PWM input values are used to drive gates of the switching transistors thereby generating voltages across the stator windings of the motor.

14. The system of claim 11, wherein the plurality of switching transistors comprises three switching transistor pairs, wherein each of the switching transistor pairs comprises a high side switch and a low side switch, wherein a first terminal of the high side switch is coupled to the supply node, wherein a second terminal of the high side switch is coupled to a first terminal of the low side switch, and wherein a second terminal of the low side switch is coupled through a current sense resistor to the ground node.

15. The system of claim 11, wherein the plurality of Hall sensors comprises:
a first Hall sensor configured to output a first one-bit digital logic value;
a second Hall sensor configured to output a second one-bit digital logic value; and
a third Hall sensor configured to output a third one-bit digital logic value, wherein the first, second, and third digital logic values are used to determine a Hall sensor output state, and wherein each of six Hall sensor output states corresponds to one of six reference phase angle values.

16. The system of claim 11, wherein the controller integrated circuit determines the adjusted reference phase angle value in a calibration mode, wherein in a normal operating mode the adjusted reference phase angle value determined in the calibration mode is used to control the motor to achieve a motor operation, wherein the motor operation results in a minimum amount of current consumption during a constant load and a constant speed condition such that if another reference phase angle value greater or less than the adjusted reference phase angle value were used in controlling the motor in the normal operating mode under the constant load and the constant speed condition, then the motor would consume more current.

17. The system of claim 16, wherein the calibration mode is activated for a second period of time when the first motor is swapped out and replaced with a second motor, wherein in the second period of time the controller integrated circuit determines a second adjusted reference phase angle value, wherein the controller integrated circuit uses the second adjusted reference phase angle value in controlling the second motor, and wherein when the second motor is swapped out and replaced with the first motor, the controller integrated circuit uses the first adjusted reference phase angle value in controlling the first motor.

18. A system comprising:
a supply node;
a ground node;
a motor having a rotor and a stator, wherein the stator includes a first stator winding, a second stator winding, and a third stator winding, and wherein the motor is a BrushLess Direct Current (BLDC) electric motor;
a plurality of Hall sensors, wherein each of the Hall sensors outputs a Hall sensor output value;
a plurality of switching transistors, wherein each of the plurality of switching transistors is coupled to receive a gate drive signal, wherein the plurality of switching transistors is coupled between the supply node and the ground node, and wherein each of the switching transistors switches a current through the motor;
a gate driver circuit coupled to receive a plurality of control signals and to output gate drive signals that control the plurality of switching transistors; and
a controller integrated circuit, wherein the controller integrated circuit is configurable to store reference phase angle values, a Pulse Width Modulation (PWM) sine wave Lookup Table (LUT), and wherein the controller integrated circuit is configurable to determine an adjusted reference phase angle value by:

(a) operating the motor in a selected direction;
(b) detecting a motor current to determine a current value;
(c) adjusting the reference phase angle value;
(d) repeating the operating of (a), the detecting of (b), and the adjusting of (c) until a detected current value is greater than a previous detected current value; and
(e) storing the adjusted reference phase angle value.

19. The system of claim 18, wherein the detecting of the motor current is a running average of motor currents during a period of time.

20. The system of claim 18, wherein the plurality of Hall sensors comprises:
a first Hall sensor configured to output a first one-bit digital logic value;
a second Hall sensor configured to output a second one-bit digital logic value; and
a third Hall sensor configured to output a third one-bit digital logic value, wherein the first, second, and third digital logic values are used to determine a Hall sensor output state, and wherein each of six Hall sensor output states corresponds to one of six reference phase angle values.

* * * * *